United States Patent
Mac et al.

(10) Patent No.: US 10,545,524 B2
(45) Date of Patent: *Jan. 28, 2020

(54) POWER SUPPLY DESIGN TOOL FOR POWER SUPPLY SYSTEM DESIGNS INCLUDING MULTI-CHANNEL REGULATORS

(71) Applicant: TEXAS INSTRUMENTS INCORPORATED, Dallas, TX (US)

(72) Inventors: Dien Mac, San Jose, CA (US); Satyanandakishore V. Vanapalli, Campbell, CA (US); Jeffrey Perry, Cupertino, CA (US); Wanda C. Garrett, Morgan Hill, CA (US); Jonathan J. Arzadon, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,789

(22) Filed: Jun. 1, 2018

(65) Prior Publication Data

US 2018/0275707 A1    Sep. 27, 2018

Related U.S. Application Data

(63) Continuation of application No. 14/276,126, filed on May 13, 2014, now Pat. No. 10,013,011.

(51) Int. Cl.
*G05F 1/625* (2006.01)
*G05F 1/66* (2006.01)
*G05B 15/02* (2006.01)
*G06F 17/50* (2006.01)

(52) U.S. Cl.
CPC .............. *G05F 1/625* (2013.01); *G05B 15/02* (2013.01); *G05F 1/66* (2013.01); *G06F 17/5063* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 5,721,485 A | * | 2/1998 | Hsu | G06F 1/26 323/901 |
| 5,901,070 A | * | 5/1999 | Trainor | G05F 1/10 700/298 |
| 6,795,009 B2 | | 9/2004 | Duffy | |
| 8,712,741 B2 | | 4/2014 | Perry | |
| 8,972,751 B2 | | 3/2015 | Perry | |

(Continued)

FOREIGN PATENT DOCUMENTS

WO    2014004501    1/2014

*Primary Examiner* — Van H Nguyen
(74) *Attorney, Agent, or Firm* — Michelle F. Murray; Charles A. Brill; Frank D. Cimino

(57) ABSTRACT

A method and system includes receiving, at a computing device including a design tool application, design parameters indicative of a plurality of power supply loads to be powered. The method further includes generating power supply solutions that do not include multi-channel voltage regulators and generating power supply solutions that do include multi-channel voltage regulators. The method also includes ranking all power supply solutions and providing the ranked power supply solutions to a user.

20 Claims, 13 Drawing Sheets

(56) References Cited

U.S. PATENT DOCUMENTS

| | | | |
|---|---|---|---|
| 9,087,164 B2 | 7/2015 | Perry | |
| 9,541,973 B2 * | 1/2017 | Yang | ................. G06F 1/26 |
| 2002/0004915 A1 | 1/2002 | Fung | |
| 2009/0076749 A1 | 3/2009 | Nasle | |
| 2010/0325599 A1 | 12/2010 | Perry | |
| 2011/0115450 A1 | 5/2011 | Pongratananukul | |
| 2011/0161683 A1 | 6/2011 | Zou | |
| 2011/0320175 A1 | 12/2011 | Perry | |
| 2011/0320848 A1 | 12/2011 | Perry | |

* cited by examiner

FIG. 7

Step 1: Enter Your Project Requirements

Source List - Configure Your Power Sources — 115

SOURCE_DC_1 | DC Input Source #1 | Tambient: 30 °C | Add Source — 605
VMin: 44 V | VMax: 52 V | ISourceMax: [Delete] 10 A — 610

☐ Prefer Modules Solutions
☐ Show multi-channel reg. solutions
[Submit Project Requirements →] — 615

110-B

Loads assigned to DC Source DC Input Source #1 — 130

| ID | Load | VLoad | ILoadMax | |
|---|---|---|---|---|
| LOAD_1 | Load #1 | 1.25 V | 3 A | Delete |
| LOAD_2 | Load #2 | 3.3 V | 0.5 A | Delete |
| LOAD_3 | Load #3 | 3.3 V | 0.2 A | Delete |
| LOAD_4 | Load #4 | 3.3 V | 2 A | Delete |
| LOAD_5 | Load #5 | 1.8 V | 1 A | Delete |
| LOAD_6 | Load #6 | 2.5 V | 0.2 A | Delete |
| LOAD_7 | Load #7 | 1.25 V | 0.2 A | Delete |
| LOAD_8 | Load #8 | 12 V | 2 A | Delete |
| LOAD_9 | Load #9 | 3.3 V | 2 A | Delete |

[Add Load]

POWER SUPPLY DESIGN TOOL FOR POWER SUPPLY SYSTEM DESIGNS INCLUDING MULTI-CHANNEL REGULATORS

CROSS-REFERENCE TO RELATED APPLICATION

This application is a Continuation of prior patent application Ser. No. 14/276,126, filed May 13, 2014, now U.S. Pat. No. 10,013,011 issued Jul. 3, 2018.

BACKGROUND

Some power supply design tools have created one power supply design at a time. Consequently, creating and evaluating multiple power supply designs for multiple loads one load at a time can be a slow and tedious process. Further exacerbating the design and evaluation process is the overwhelming supply of components that are useful in power supply designs such as voltage regulators.

SUMMARY

Some embodiments are directed to a system that includes a database and as server. The database is configured to store information including characteristics of a plurality of components including a plurality of multi-channel voltage regulators. The server is in communication with the database and is configured to receive design parameters indicative of a plurality of power supply loads to be powered and determine a plurality of power supply architectures that may be used to provide power supply solutions satisfying the plurality of loads. Each power supply architecture includes at least one position requiring a component configured to satisfy a load requirement. For each one of at least a subset of the plurality of power supply architectures, the sever is to determine, based on the characteristics of the plurality of components, at least one component configured to satisfy the corresponding load requirement for each position of the one of the power supply architectures, at least one of the positions occupied by a multi-channel voltage regulator. The server further generates at least one power supply design in accordance with the power supply architectures and the determined components.

Other embodiments are directed to a method that includes receiving, at a computing device including a design tool application, design parameters indicative of a plurality of power supply loads to be powered. The method further includes generating power supply solutions that do not include multi-channel voltage regulators and generating power supply solutions that do include multi-channel voltage regulators. The method also includes ranking all power supply solutions and providing the ranked power supply solutions to a user.

Yet other embodiments are directed to a non-transitory computer-readable medium containing machine readable instructions that, when executed by a processing resource, causes the processing resource to perform various actions. Examples of such actions include receiving design parameters indicative of a plurality of power supply loads to be powered, generating power supply solutions that do not include multi-channel voltage regulators, generating power supply solutions that do include multi-channel voltage regulators, ranking all power supply solutions, and providing the ranked power supply solutions to a user.

BRIEF DESCRIPTION OF THE DRAWINGS

FIG. 7 illustrates an exemplary user interface for the input of design requirements illustrating the inclusion of multiple loads into the design requirements.

DETAILED DESCRIPTION

Figure 1:
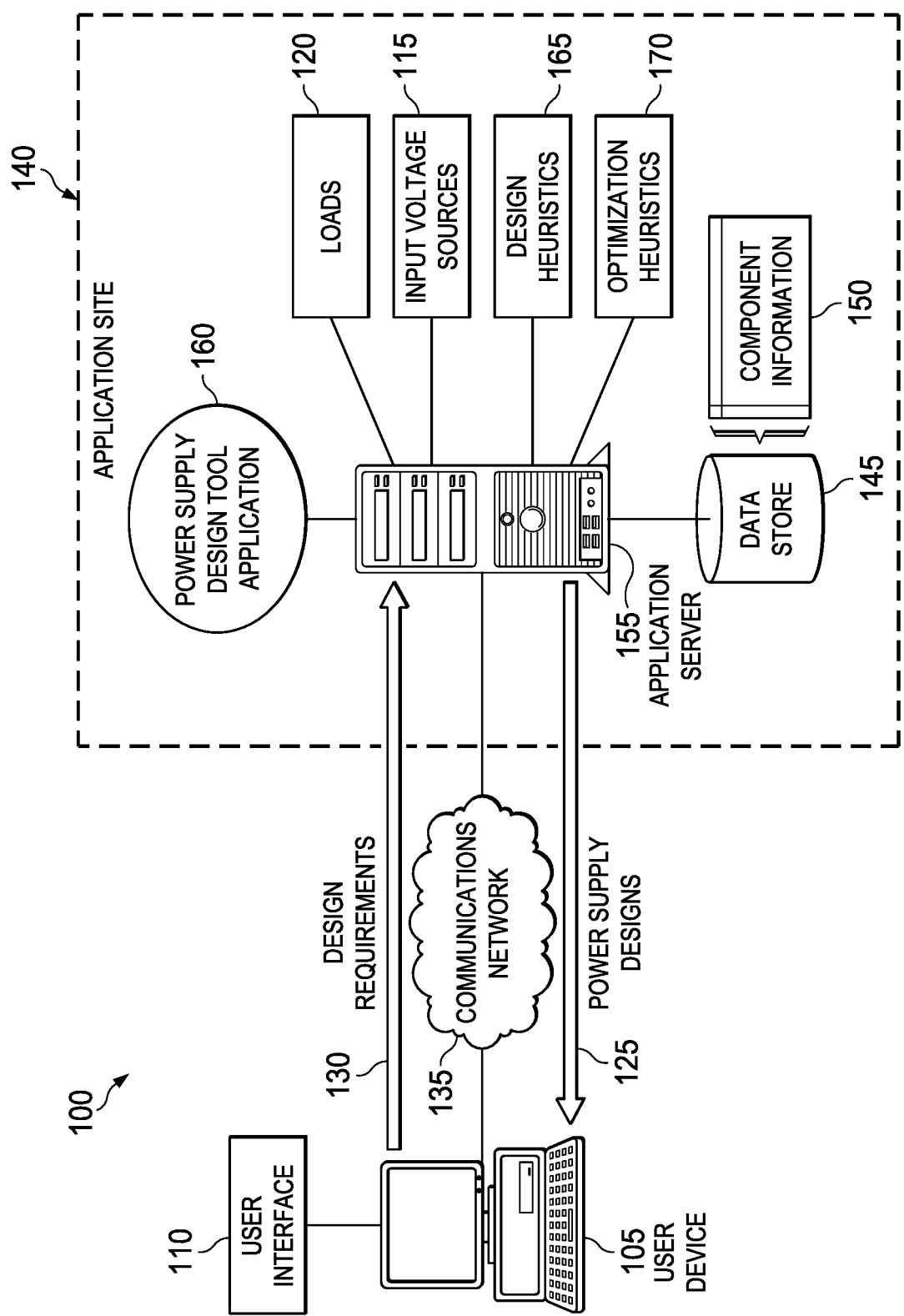
FIG. 1 illustrates an exemplary system for determining power supply architectures.

For a single load, a manufacturer of power supply components may be able to supply on the order of dozens of possible designs that satisfy a given set of power supply requirements. These design solutions may include various power supply components and supporting components to allow the power supply components to function for the particular application. Additionally, these different design solutions may take up different footprints, have different electrical efficiency ratings, and have different component costs. Some design solutions may include single channel only voltage regulators, while other design solutions include multi-channel voltage regulators or even a combination of single channel and multi-channel voltage regulators Multiple design solutions may be possible for a given set of loads and power supply requirements including various combinations of voltage and current ratings. The embodiments described herein provide a design tool that permits a user to quickly and efficiently determine the various design solutions including at least multi-channel voltage regulators. The design tool also permits efficient comparison of each of the designs solutions by hand to determine an appropriate power supply design to satisfy the user's needs.

The disclosed design tool is configured to generate solutions on a dynamic basis, based on a request for solutions configured to power a set of multiple loads. Designing power supply systems that use multi-channel voltage regulators can be an overwhelming task due to the large number of such devices on the market and the even large number of possible designs that may use a combination of single channel and multi-channel voltage regulators. Thus, the design tool automatically proposes design solutions that include multi-channel voltage regulators, thereby alleviating the burden on the system designer. The design tool may utilize various heuristics to selectively group the multiple loads, determine potential intermediate voltage rails, and dynamically compute a multitude of power supply design architectures that can power the set of load requirements. Each power supply architecture may include positions at which components configured to satisfy the load requirements are to be determined. In at least some of the computed power supply design architectures, a multi-channel voltage regulator is included in at least one of the positions of each such architecture. Using the generated power supply design architectures and a database of component information, the design tool may utilize various heuristics to determine components to use to implement the power supply design architectures in light of design goals for the solutions, and may generate a set of different solutions that each are capable of powering the set of multiple loads.

Components may be added or removed from the database of component information to allow for the dynamic creation of different solutions. Further, because the solutions are created dynamically upon user request, the generated solutions are always up-to-date based on the component information in the database. In some instances, the design tool may be configured to prefer components from one or more vendors, manufacturers, or suppliers.

The design tool may further optimize the generated designs in accordance with additional design parameters indicating a tradeoff between various optimizations, such as power supply efficiency, component and printed circuit board footprint size, and overall component cost. The design tool may also provide a capability for graphical comparison and analysis of the resulting design solutions. Through use of the design tool, a user may quickly design and optimize a power supply configured to power a set of multiple loads and customized to the user's needs.

FIG. 1 illustrates an exemplary system 100 for determining power supply solutions for multiple power supply loads. As illustrated in FIG. 1 the exemplary system includes a user device 105 configured to provide a user interface 110 where the user interface 110 is configured to receive design requirements 130 relating to at least one input voltage source 115 and a plurality of loads 120 and display a set of power supply designs 125. The system 100 further includes a communications network 135 in selective communication with the user device 105 and an application site 140. The application site 140 includes a data store 145 configured to store component information 150. The application site 140 further includes an application server 155 configured to run a power supply design tool application 160. The power supply design tool application 160 may receive the design requirements 130, and may produce the set of power supply designs 125 responsive to the design requirements 130, relevant design heuristics 165 and optimization heuristics 170, as well as selected component information 150 from the data store 145. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

The user device 105 may be a device configured to be operated by one or more users, such as a cellular telephone, laptop computer, tablet computing device, personal digital assistant, or desktop computer workstation, among others. The user device 105 may include one or more components capable of receiving input from a user (e.g., via a keyboard, mouse, etc.), and providing output to the user (e.g., a display).

The user interface 110 may be an interface configured to allow for the effective operation and control of the user device 105. The user interface 110 may further provide feedback and other output to the user to aid the user in making operational decisions with respect to the user device 105. Exemplary user interfaces 110 may include input devices such as keyboards, buttons, and microphones, and output devices such as display screens and loudspeakers. As a particular example, a user interface 110 may be implemented by way of one or more web pages displayed by the user device 105 by way of a web browser software program. Such a web-based user interface 110 may accept input from a user by way of one or more controls on a web page and may provide output by displaying web pages to the user including feedback or other outputs of the system 100. As another example, a user interface 110 may be implemented by way of a self-contained rich internet application (MA) utilizing an engine such as Adobe Flash, where the MA may accept input from a user by way of one or more controls and provide output that may be viewed by the user on the user device 105.

An input voltage source 115 may be a device or system that produces or derives an electromotive force between its terminals. Input voltage sources 115 may be defined according to the voltage and maximum current draw they provide, and may further be defined according to a name to aid in identification. A load 120 may be an electrical device or circuit that requires electrical power to operate. Loads 120 may be defined as a required voltage and maximum current draw. Loads 120 may further be defined according to a name or other identifier to aid in their identification. A power supply may be a source of electrical power, and a power supply design 125 may be a circuit including various components that draw power from one or more input voltage sources 115 and supply electrical energy to at least one load 120.

The design requirements 130 may include information regarding a set of multiple loads 120 to be powered by one or more input voltage sources 115. The information may include minimum, maximum, and nominal input voltage, ambient temperature, maximum input current, and other design inputs about one or more input voltage sources 115. The information may also include details of the loads 120 to be powered, such as a required voltage, a required current, a name or other identifier, and other power supply attributes of the loads 120.

The communications network 135 may include a mixture of wired (e.g., fiber and copper) and wireless mechanisms that incorporate related infrastructure and accompanying network elements. Illustrative communication networks 135 may include the Internet, an intranet, the Public Switched Telephone Network (PSTN), and a cellular telephone network. The communications network 135 may include multiple interconnected networks and/or sub-networks that provide communications services, including data transfer and other network services to at least one user device 105 connected to the communications network 135.

The communications network 135 may be in selective communication with an application site 140. The application site 140 may be a hosting platform, such as a web hosting platform, configured to make applications available over the communications network 135. To perform the hosting functions, the application site 140 may include computing devices such as one or more data stores 145 and application servers 155.

The data store 145 may include one or more data storage mediums, devices, or configurations, and may employ various types, forms, and/or combinations of storage media, including but not limited to hard disk drives, flash drives, read-only memory, and random access memory. The data store 145 may include various technologies useful for storing and accessing any suitable type or form of electronic data, which may be referred to as content. Content may include computer-readable data in any form, including, but not limited to video, image, text, document, audio, audio-visual, metadata, and other types of files or data. Content may be stored in a relational format, such as via a relational database management system (RDBMS). As another example, content may be stored in a hierarchical or flat file system. In particular the data store 145 may store content including component information 150. Notably, the data store 145 maintains information with respect to individual components, not completed designs, solutions, or formulations.

The component information 150 may include information on the individual components, such as power supply regulators (switching regulators, low drop out regulators (LDOs), switched capacitors or other types of voltage regulators), capacitors, resistors, diodes, etc. The voltage regulators may include single channel voltage regulators and multi-channel voltage regulators. Component information 150 may be received from manufacturers or suppliers in various forms, such as parts information sheets, parts catalogs, schematics, among others. The received component information 150 may be formatted and saved into the data store 145 for use in determining designs. Exemplary component information 150 may include part cost, whether the part is in stock, part dimensions and footprint, pin configuration, minimum and maximum ranges of operation, light output, heat sink requirements, efficiency information, graphs of various characteristics of operation, what manufacturers produce the component (or an equivalent component) and what suppliers or vendors supply the component, among other exemplary characteristics. For a multi-channel regulator, for example, the component information may include the number of channels and, for each channel, the range of operating voltages and current. The component information 150 includes information about the components themselves, not the components in combination with other components.

The application site 140 may further include an application server 155. The application server 155 may be implemented as a combination of hardware and software, and may include one or more software applications or processes for causing one or more computer processors to perform the operations of the application server 155 described herein.

A power supply design tool application 160 may be one application included on the application server 155, wherein the power supply design tool application 160 may be implemented at least in part by instructions stored on one or more non-transitory computer-readable media. The power supply design tool application 160 may include instructions to cause the application server 155 to receive design requirements 130 indicating a set of multiple loads 120, query the data store 145 for component information 150 related to the design requirements 130, produce a set of power supply designs 125 responsive to the design requirements 130 and component information 150, and return the power supply designs 125 for further analysis and use.

The power supply design tool application 160 may utilize design heuristics 165 when determining the set of power supply designs 125 responsive to the design requirements 130. Design heuristics 165 may include rules related to the generation of different power supply architectures which may be appropriate to power the loads 120 specified by the design requirements 130. The design heuristics 165 may allow for the generation of a plurality of power supply architectures indicating potential arrangements of components between the one or more input voltage sources 115 and the plurality of loads 120 specified by the design requirements 130. For example, a design heuristic 165 may be utilized to identify a multi-channel voltage regulator to be used in a given power supply architecture. By way of another example, a design heuristic 165 may be utilized to determine intermediate rail voltages for possible power supply architectures. As another example, a design heuristic 165 may be utilized to break down the plurality of loads 120 specified by the design requirements 130 into one or more groups with smaller total currents.

The power supply design tool application 160 may utilize optimization heuristics 170 when determining the set of power supply designs 125 responsive to the design requirements 130. These optimizations may guide the determination of some or even all of the components 205 and supporting component of the power supply designs 125. Optimization heuristics 170 may be responsive to parameters indicative of tradeoffs between various design goals, and may be utilized to prefer one or more parameters over other parameters of a component or design. Design goals to be optimized by optimization heuristics 170 may include small component footprint, efficiency, cost, thermal dissipation, and power utilized, among others. As an example, an optimization heuristic 170 for designs with a smaller footprint may optimize for size by choosing components with relatively smaller footprints that still satisfy the design requirements 130, but at the expense of other parameters such as efficiency. As another example, an optimization heuristic 170 for designs with a higher efficiency may optimize by choosing components capable of being utilized at a relatively higher switching frequency while still satisfying the design requirements 130, but at the expense of other parameters such as cost. Optimization heuristics 170 may further be utilized by the power supply design tool application 160 to give preferred treatment to at least one component unrelated to its electrical or physical characteristics. The optimization heuristics 170 may be applied be a subset of components or even to all components. For example, an optimization heuristic 170 may prefer components from a particular manufacturer or supplier over those from another manufacturer or supplier.

Computer-executable instructions may be compiled or interpreted from computer programs created using a variety of well-known programming languages and/or technologies, including, without limitation, and either alone or in combination, Java™, C, C++, Visual Basic, Java Script, Perl, PL/SQL, etc. The power supply design tool application 160 may accordingly be written at least in part according to a number of these and other programming languages and technologies, or a combination thereof.

In some instances, the power supply design tool application 160 is provided as software that when executed by a processor of the application server 155 provides the operations described herein. Alternatively, the power supply design tool application 160 may be provided as hardware or firmware, or combinations of software, hardware and/or firmware. An exemplary modularization of the power supply design tool application 160 is discussed in further detail below with respect to FIG. 4.

In general, computing systems and/or devices, such as user device 105, application server 155, and data store 145 may employ any of a number of well-known computer operating systems, including, but by no means limited to, known versions and/or varieties of the Microsoft Windows®™ operating system, the Unix™ operating system (e.g., the Solaris®™ operating system distributed by Sun Microsystems™ of Menlo Park, Calif.), the AIX UNIX™ operating system distributed by International Business Machines of Armonk, N.Y., and the Linux™ operating system. Examples of computing devices include, without limitation, a computer workstation, a server, a desktop, notebook, laptop, or handheld computer, or some other known computing system and/or device.

Computing devices, such as data store 145 and application server 155 generally include computer-executable instructions, where the instructions may be executable by one or more computing devices such as those listed above. In general, a processor (e.g., a microprocessor) receives instructions, e.g., from a non-transitory computer-readable medium such as memory and executes these instructions, thereby performing one or more processes, including one or more of the processes described herein. Such instructions and other data may be stored and transmitted using a variety of known computer-readable media.

A non-transitory computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as such as data store 145 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, the system 100 may be implemented as an off-line or self-contained computing device based configuration. In such an implementation, the application server 155 and power supply design tool application 160 may be implemented by a back-end calculation engine running on the computing device. In some implementations, the power supply design tool application 160 may be executed by way of a self-contained RIA utilizing an engine such as Adobe Flash. For example, the MA may be downloaded by a client from a server by way of a network such as the Internet or an intranet, and where most or substantially all of the calculations performed by the system 100 may be performed on the client using the MA, without need to go back to the server again during a design session.

Further, additional elements may be included or elements shown in FIG. 1 may be omitted or modified. For example, one or more of the user device 105, data store 145, and application server 155 may be combined in certain implementations. As another example, a system may include multiple data stores 145 and/or application servers 155. In still further examples, power supply design tool application 160 may be implemented across multiple application servers 155. While communications network 135 is shown in the illustrated embodiment, in other embodiments the communications network 135 may be omitted entirely and the user device 105 may be connected directly to the application site 140. In still other examples, the power supply design tool application 160 may be executed in whole or in part by the user device 105.

Figure 2A:
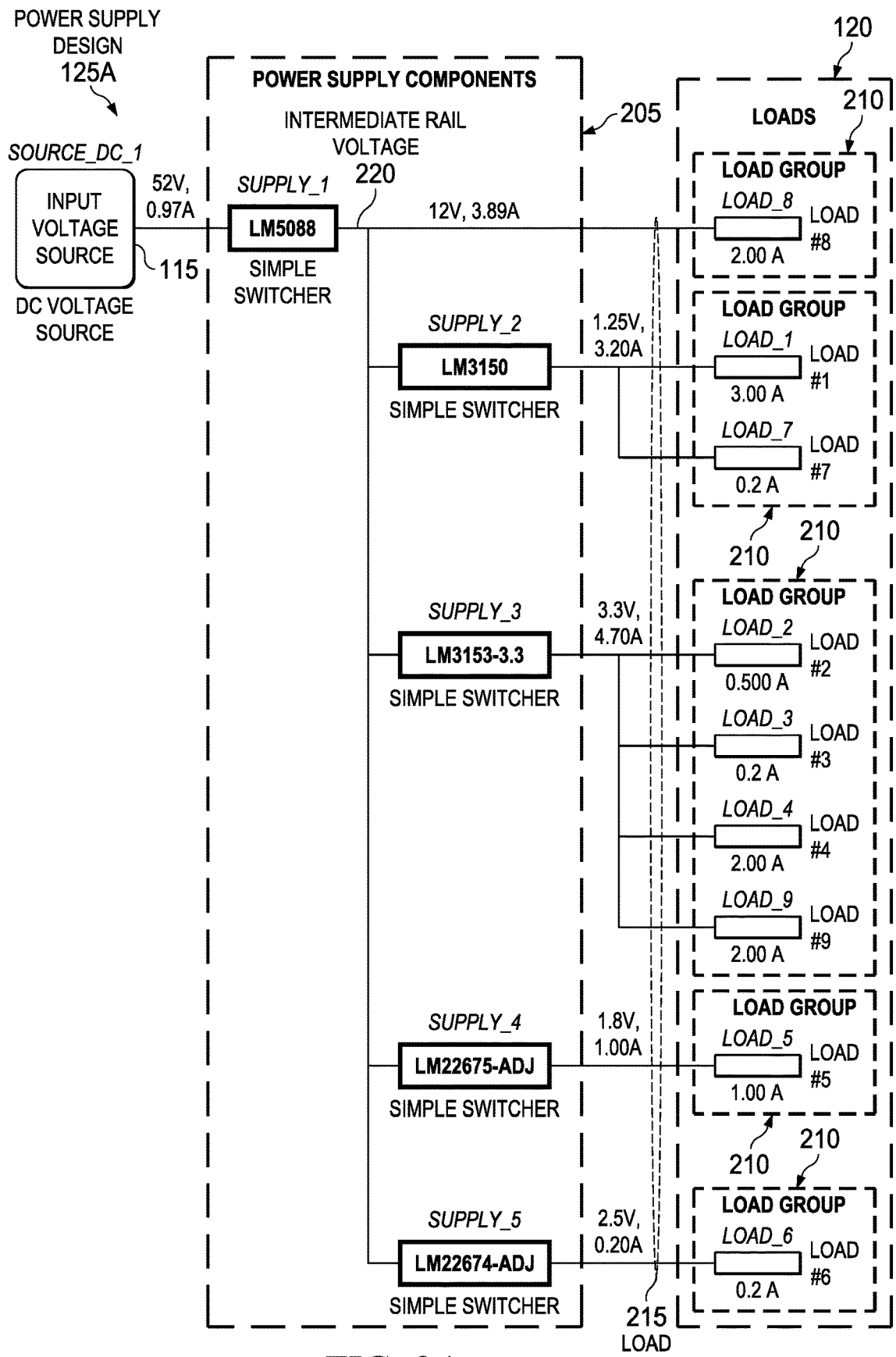
FIGS. 2A-2B illustrate exemplary power supply designs having multiple loads.

FIG. 2A illustrates an exemplary power supply design 125A that may be used to power an exemplary set of multiple loads 120. As shown in FIG. 2A, the exemplary power supply design 125A is powered by a single input voltage source 115, and provides power to the following set of loads 120: a first load 120 (LOAD_1) requiring 1.25V at 3 A, a second load 120 (LOAD_2) requiring 3.3V at 0.5 A, a third load 120 (LOAD_3) requiring 3.3V at 0.2 A, a fourth load 120 (LOAD_4) requiring 3.3V at 2 A, a fifth load 120 (LOAD_5) requiring 1.8V at 1 A, a sixth load 120 (LOAD_6) requiring 2.5V at 0.2 A, a seventh load 120 (LOAD_7) requiring 1.25V at 0.2 A, an eighth load 120 (LOAD_8) requiring 12V at 2 A, and a ninth load 120 (LOAD_9) requiring 3.3V at 2 A. The power supply design 125 further illustrates the grouping of the multiple loads 120 into load groups 210, as well as the determined load requirements 215 for each load group 210 and intermediate rail voltage 220. It should be noted that the exemplary power supply design 125 is only one of many possible power supply designs 125 that may be used to power the illustrated multiple loads 120.

A power supply component 205 may be a component such as a switching regulator controller configured to provide a regulated output at a specified voltage and current. A power supply component 205 may accordingly provide a regulated output at the specified voltage for up to a maximum amount of current. The power supply components in the illustrative power supply design 125A of FIG. 2A include single-channel voltage regulators, that is a regulator with only a single regulated output voltage.

Because a power supply component 205 may provide a regulated output at a particular voltage, multiple loads 120 that share a common voltage may be grouped and accordingly powered from the same power supply component 205, provided that the power supply component 205 can supply the necessary current. A load group 210 is a grouping of one or more loads 120 according to common voltage. A load requirement 215 includes the requirements for the powering of a corresponding load group 210. For example, the load requirement 215 for a load group 210 may be determined according to the common voltage of the group and a sum of the currents of each load 120 of the load group 210.

For example, as shown in FIG. 2A, the first load 120 requires 1.25V at 3 A, and the seventh load 120 requires 1.25V at 0.2 A. These loads 120 may be grouped together into a load group 210 having a load requirement 215 of 1.25V at a combined current of 3.2 A. Load groups 210 may allow for the powering of multiple loads 120 by a single power supply component 205, thus reducing in the total number of required power supply components 205 for a power supply architecture 305. Further details regarding load groups 210 and load requirements 215 are discussed in detail below.

An intermediate rail voltage 220 may provide an intermediate voltage level between an input voltage source 115 and an output voltage to power a load 120 or load group 210. The intermediate rail voltage 220 may be used as an input to a power supply component 205 configured to produce an output for one or more of the loads 120 or load groups 210. An intermediate rail voltage 220 may be produced by way of a power supply component 205 configured to power the intermediate voltage level. Intermediate rail voltages 220 may require additional power supply components 205 to produce the intermediate rail voltages 220. However, the use of intermediate rail voltages 220 may allow for the use of more efficient, lower power, or lower cost power supply components 205 to supply the loads 120, where these power supply components 205 may not be usable or as efficient they were connected to the input voltage source 115 directly. Further details regarding intermediate rail voltages 220 are discussed in detail below.

The exemplary power supply design 125A includes an LM5088 power supply component 205 (SUPPLY_1) configured to generate a 12V intermediate rail voltage 220 and also to power the eighth load 120. The power supply design 125 further includes an LM3150 power supply component 205 (SUPPLY_2) configured to supply 1.25V to a load group 210 including the first and seventh loads 120 and drawing from the 12V intermediate rail voltage 220. The power supply design 125 further includes an LM3153-3.3 power supply component 205 (SUPPLY_3) configured to supply 3.3V to a load group 210 including the second, third, fourth, and ninth loads 120, also drawing from the 12V intermediate rail voltage 220. The power supply design 125 further includes an LM22675-ADJ power supply component 205 (SUPPLY_4) configured to supply 1.8V to the fifth load 120, also drawing from the 12V intermediate rail voltage 220. The power supply design 125 further includes an LM22674-ADJ power supply component 205 (SUPPLY_5) configured to supply 2.5V to the sixth load 120, also drawing from the 12V intermediate rail voltage 220.

It should be noted that the power supply design 125 illustrated in FIG. 2 is merely exemplary, and other power supply designs 125 configured to power the same or different sets of loads 120 are possible. For example, one or more of the power supply components 205 providing power to the multiple loads 120 may be powered from the input voltage source 115 directly, without making use of any intermediate rail voltages 220. As another example, more or fewer loads 120 may be powered by the intermediate rail voltages 220. As yet a further example, an intermediate rail voltage 220 may power another intermediate rail voltages 220, which in turn power one or more power supply components 205, providing power to one or more loads 120. Accordingly, in some examples a load requirement 215 may be a requirement for a power supply component 205 to supply power to one or more intermediate rail voltages 220 as well as to one or more loads 120 or load groups 210.

Figure 2B:
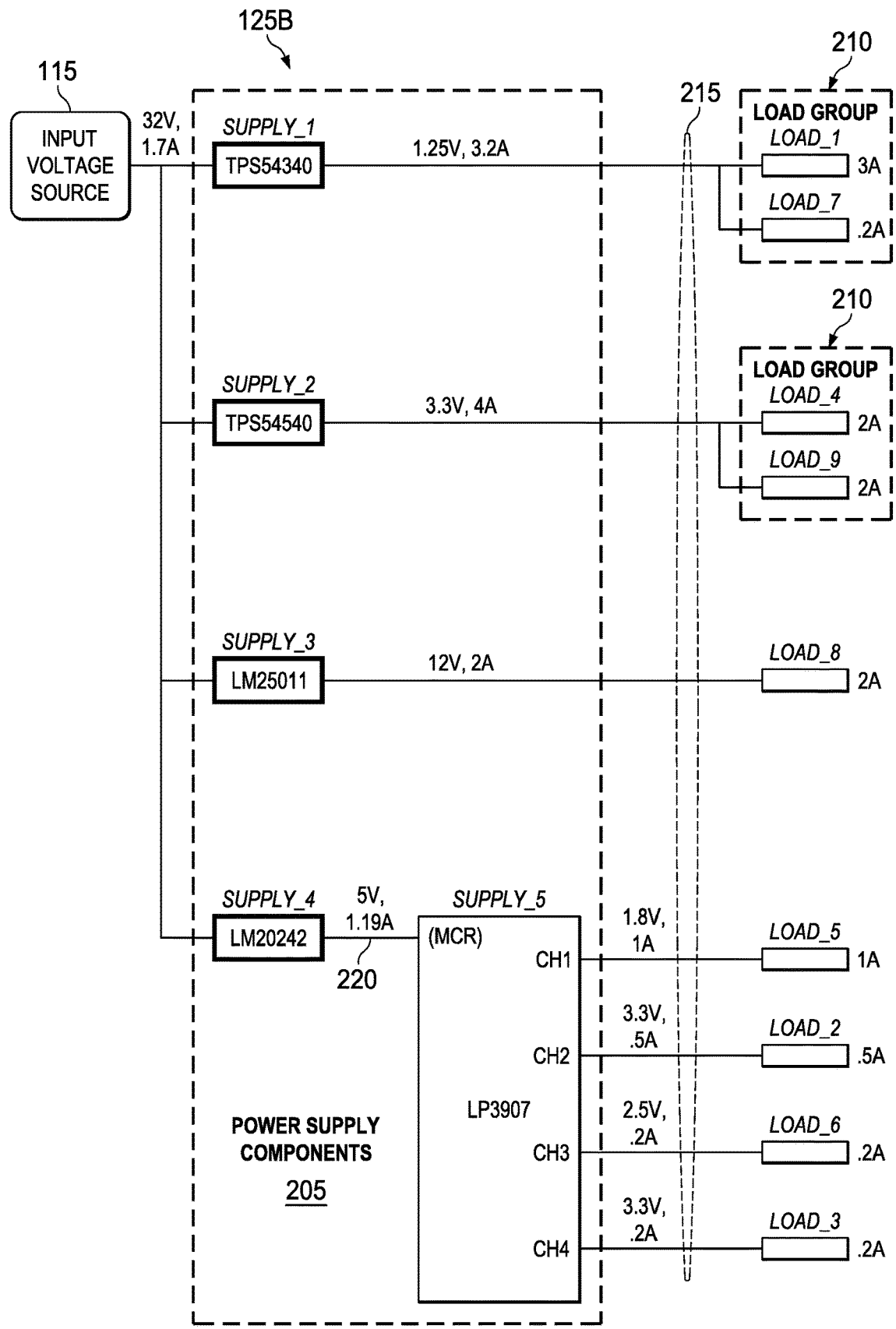

FIG. 2B shows an example of a power supply design 125B that includes a multi-channel voltage regulator. The input voltage source 115 in this example provides 32V at 1.7 A to power supply components SUPPLY_1 (e.g., a TPS54540), SUPPLY_2 (e.g., a TPS54540), SUPPLY_3 (e.g., a LM25011), and SUPPLY_4 (e.g., a LM20242). The loads in this example are the same as in FIG. 2A. SUPPLY_1 is a single-channel voltage regulator that produces 1.25V at 3.2 A for loads LOAD_1, LOAD_7 and LOAD_4. LOAD_1 and LOAD_7 are grouped together in a load group 210. SUPPLY_2 is also a single-channel voltage regulator that produces 3.3V at 4 A for powering LOAD_4 and LOAD_9 which are also grouped together as shown. SUPPLY_3 is a single-channel voltage regulator that produces 12V at 2 A for powering LOAD_8.

SUPPLY_4 is a single-channel voltage regulator that produces an intermediate voltage rail 220 (5V at 1.19 A). The intermediate voltage rail 220 is provided to SUPPLY_5 which is a multi-channel voltage regulator (e.g., an LP3907). The multi-channel voltage regulator provides four channels (CH1-CH4). Channel 1 is configured to provide 1.8V at 1 A for power LOAD_5. Channel 2 is configured to provide 3.3V at 0.5 A for powering LOAD_2. Channel 3 is configured to provide 2.5V at 0.2 A for powering LOAD_6. Channel 4 is configured to provide 3.3V at 0.2 A for powering LOAD_3.

Figure 3:
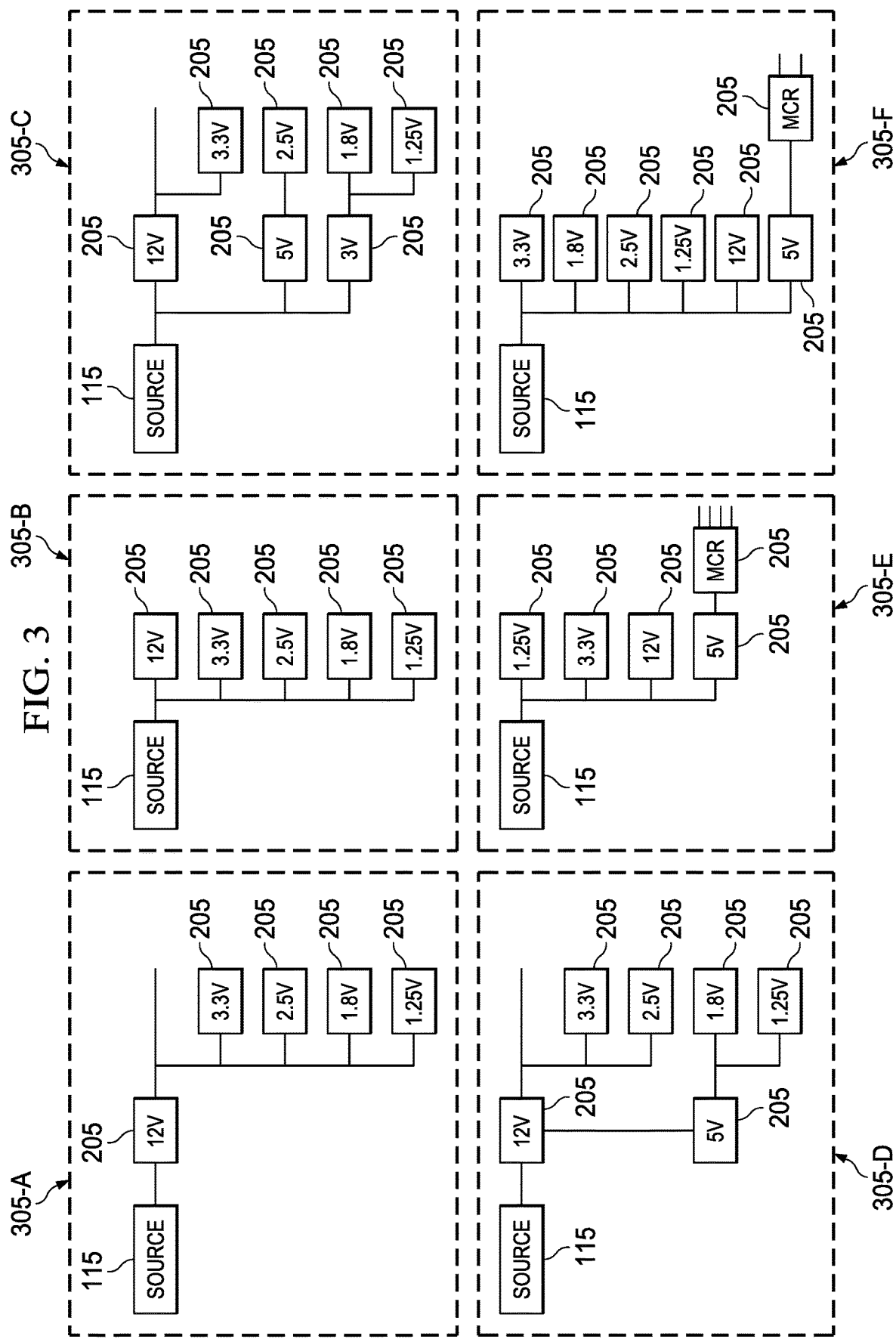
FIG. 3 illustrates five exemplary power supply architectures that may be used to power a set of multiple loads.

FIG. 3 illustrates five exemplary power supply architectures 305-A through 305-E that may be used to power the same set of loads 120 discussed above with respect to FIGS. 2A and 2B. The power supply architecture 305-A illustrates an exemplary power supply design 125 from which a power supply designs 125 such as the one shown in FIG. 2A may be constructed. Additionally, FIG. 3 further illustrates several additional power supply architectures 305-B through 305-E that may also be used to produce power supply designs 125 that power the multiple loads 120. For example, power supply designs 125 may be created according to power supply architecture 305-B having no intermediate rail voltage 220, power supply architecture 305-C having 3V, 5V, and 12V intermediate rail voltages 220, and power supply architecture 305-D having a 24V intermediate rail voltage 220. The power supply architectures of 305-A, 305-B, 305-C, and 305-D include single-channel voltage regulators only. Power supply architecture 305-E and 305-F include a multi-channel voltage regulator. Power supply architecture 305-E tracks the example of FIG. 2B and 305-E provides an alternative architecture but one that also includes a multi-channel voltage regulator.

Figure 4:
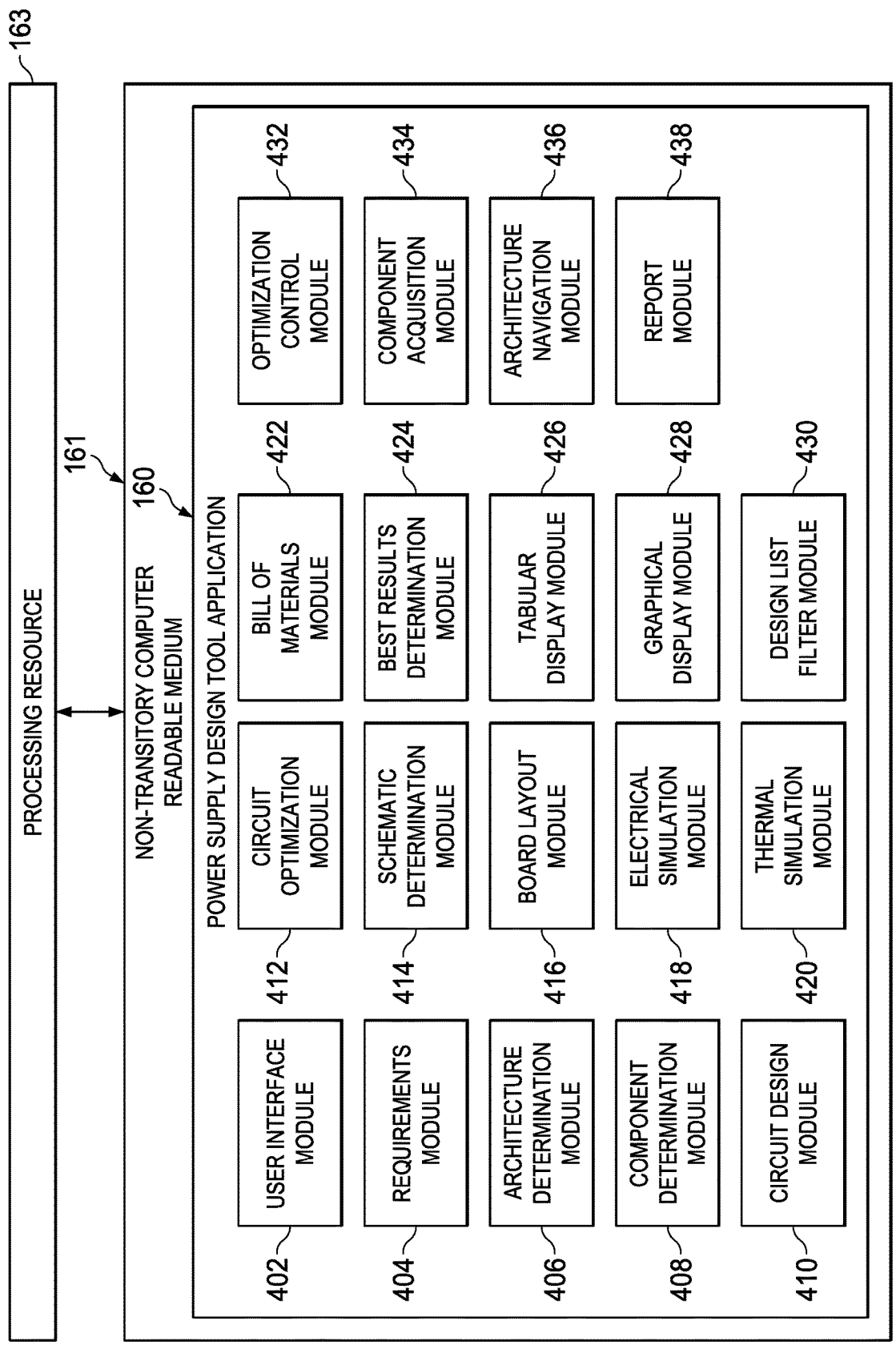
FIG. 4 illustrates an exemplary modularization of a power supply architecture design tool application.

FIG. 4 illustrates an exemplary modularization of the power supply design tool application 160. As shown in the figure, the power supply design tool application 160 may include a user interface module 402, requirements module 404, an architecture determination module 406, a component determination module 408, a circuit design module 410, a circuit optimization module 412, a schematic determination module 414, a board layout module 416, an electrical simulation module 418, a thermal simulation module 420, a bill of materials module 422, a best results determination module 424, a tabular display module 426, a graphical display module 428, a design list filter module 430, an optimization control module 432, a component acquisition module 434, an architecture navigation module 436, and a report module 438. Although only one example of the modularization of the power supply design tool application 160 is illustrated and described, it should be understood that the operations thereof may be provided by fewer, greater, or differently named modules.

As shown in FIG. 4, the various modules comprising the power supply design tool application 160 are stored on a non-transitory computer-readable medium 161 and are executable by a processing resource 163. The processing resources may include a single processor, multiple processors, a single computer (e.g., application server) or a network of computers. The non-transitory computer-readable medium 161 may include volatile storage (e.g., random access memory), non-volatile storage (e.g., hard drive, optical disk, flash storage, etc.) or combinations thereof.

The user interface module 402 may be configured to provide the user interface 110 to be displayed by way of the user device 105. For example, the user interface module 402 may be implemented by way of one or more web pages configured to accept the design requirements 130 from a user and provide output to the user including power supply designs 125. The user interface module 402 may be implemented using technologies such as Java, AJAX, Adobe Flex, Adobe Flash, Microsoft.NET, among others. The user interface module 402 may be configured to generate web pages via the application server 155 to be transmitted to the user device 105 via the communications network 135. These web pages may then be viewed by the user on the user device 105 using a web browser program.

Exemplary user interfaces 110 allowing for the specification of design requirements 130 and the viewing of power supply designs 125 are illustrated with respect to FIGS. 6-10 described below. It should be noted that the while specific user interfaces 110 are illustrated in the exemplary figures, the particular user interfaces 110 presented by the power supply architecture design tool application 160 and the user interface module 402 may vary from implementation to implementation.

The requirements module 404 may be configured to utilize the user interface module 402 to allow the user of the user device 105 to specify design requirements 130 for the power supply designs 125. For example, the requirements module 404 may cause the user interface module 402 to generate web pages configured for receiving the design requirements 130.

The requirements module 404 may be configured to allow a user to specify design requirements 130 including one or more input voltage sources 115. For example, a user may provide minimum, maximum, and nominal input voltage, ambient temperate, maximum input current and/or other critical design inputs about the input voltage source 115. The user may add additional input voltage sources 115 to the design requirements 130 if desired.

The requirements module 404 may further be configured to allow a user to specify design requirements 130 including a set of loads 120 to be provided power by the power supply design 125. For example, the user may provide voltage, current, name and other power supply attributes for multiple loads 120. In some examples, the requirements module 404 may allow for the import or upload of data regarding a set of multiple loads 120 from an input file, such as a text file or spreadsheet. One or more loads 120 may be assigned to a specific input voltage source 115 by a user if desired, or the loads 120 may be automatically assigned to input voltage sources 115.

The architecture determination module 406 may determine a variety of different power supply architectures 305 that may be appropriate to power the loads 120, based on one or more design heuristics 165 of the system 100. Based on the user-provided design requirements, at least one of the power supply architectures determined by the architecture determination module 406 includes at least one multi-channel voltage regulator. The architecture determination module 406 may selectively group various of the loads 120 into load groups 210. Each load group shares a common supply. Further, the architecture determination module 406 may determine potential intermediate rail voltages 220, define load requirements 215 for each of the load groups 210 and intermediate rail voltages 220, and construct power supply architectures 305 based on at least a subset of the design requirements 130, loads 120, load groups 210, load requirements 215, and potential intermediate rail voltages 220. Based on the groupings and arrangements, the architecture determination module 406 may define one or more positions into which power supply components 205 are to be included, as well as load requirements 215 for each of the positions. At least one of the positions for some of the determined architectures is occupied by a multi-channel voltage regulator as determined by the architecture determination module 406.

In accordance with various embodiments, the architecture determination module 406 determines power supply architectures that only include single channel voltage regulators in parallel or sequentially with architectures that include multi-channel voltage regulators. The resulting combined architectures are then presented to the user for comparison and analysis.

To determine a power supply architecture that includes a multi-channel regulator, the architecture determination module 406 selects for consideration each multi-channel voltage regulator from the database. For each such multi-channel voltage regulator, the architecture determination module 406 scans all unassigned loads through the channels of that regulator to determine a channel utilization level. A load can be assigned to a particular channel of the multi-channel regulator if that particular channel can supply the appropriate combination of voltage and current for the given load. If more than a threshold amount (e.g., 50%) of the multi-channel voltage regulator's channels can be assigned user-specified loads, then that multi-channel voltage regulator is included in the power supply architecture. The threshold amount may be preset (e.g., 50% default) or may be user-specified through a graphical user interface (GUI). Loads are then assigned to the channels of the regulator until either all loads have been assigned, all channels are occupied with loads, or an empty channel remains but no more loads can be assigned to that channel (e.g., because that channel cannot supply the correct voltage/current for a remaining unassigned load).

Additional multi-channel voltage regulators are selected and analyzed in a similar fashion until either all loads are assigned or all multi-channel voltage regulators have been considered. At that point, if one or more loads remain as being unassigned to a voltage regulator, then single-channel voltage regulators are selected for the remaining such loads. This process is described in more detail below and in particular with regard to the flow charts of FIGS. 5A-5D.

As explained above, part of the power supply architecture determination process may include combining loads of a common voltage requirement for powering by a common voltage regulator. Based on one or more design heuristics 165 of the system 100, the architecture determination module 406 may selectively combine loads 120 specified by the design requirements 130 into load groups 210, where the grouped loads 120 in the load group 210 may utilize a common power supply. As an example, one or more system 100 design heuristics 165 may specify for the architecture determination module 406 to group loads 120 with the same voltage together on a common power supply. The architecture determination module 406 may accordingly determine a load requirement 215 for each load group 210 by summing the current requirements for each of the loads 120 in the load group 210. However, the design requirements 130 may specify that a load 120 requires a unique supply, in which case that load 120 would not be grouped with other loads 120 on a common supply.

To aid in the determination of whether to group loads 120 into load groups 210, the one or more design heuristics 165 of the system 100 may specify a threshold current value above which it would be less likely to find a suitable power supply component 205 for a power supply design 125. Accordingly, if a load group 210 results in a sum of the load 120 currents being above the threshold value, the architecture determination module 406 may break the loads 120 down into two or more load groups 210, each with a smaller total current, to allow for a greater number of possible power supply components 205 to be available to provide power to the load groups 210.

The architecture determination module 406 may accordingly determine load requirements 215 for each position in a power supply architecture 305 based at least in part on the summed currents for each load group 210.

Based on one or more design heuristics 165, the architecture determination module 406 may calculate one or more potential intermediate rail voltages 220. Using the calculated intermediate rail voltages 220, the architecture determination module 406 may generate various power supply architectures 305 having zero or more of the potential intermediate rail voltages 220. For example, FIG. 3 discussed above illustrates an exemplary set of power supply architectures 305 capable of powering the same set of loads 120, where each exemplary power architecture 305-A through 305-F has a different configuration of intermediate rail voltages 220 and some architectures include multi-channel voltage regulators, while other architectures do not. Accordingly, power supply architectures 305 including various intermediate rail voltages 220 and single or multi-channel voltage regulators may allow for the generation of power supply designs 125 having different characteristics and tradeoffs.

An example of a design heuristic 165 that may be utilized to calculate power supply architectures 305 having intermediate rail voltage 220 may be to calculate appropriate intermediate rail voltage 220 according to the duty cycle of downstream regulators, targeting low, medium, and high duty cycle for the downstream supplies.

Another example of a design heuristic 165 that may be used to calculate power supply architectures 305 having intermediate rail voltage 220 may be to set different percentages of the difference between the input voltage source 115 and the loads 120 or load groups 210. Exemplary percentages for intermediate rail voltage 220 may include 75%, 50%, and/or 25% of the voltage difference between a voltage source and a load. For instance, if an input voltage source 115 is 50V, and one of the loads 120 requires a 10V supply (i.e., 40V difference), then possible power supply architectures 305 may include an intermediate rail voltage of 30V, 20V, or 10V (i.e., 75%, 50%, and 25% of the 40V difference between the 50V input voltage and the 10V load voltage).

Using the calculated intermediate rail voltage 220, the architecture determination module 406 may generate various power supply architectures 305 by utilizing various combinations of the intermediate rail voltages 220. Using one of the combinations of zero or more intermediate rail voltages 220, the architecture determination module 406 may start at each load 120, or load group 210, and may sum up the currents or use the summed current from a corresponding load requirement 215. Then for each load 120 or group of loads 120, the architecture determination module 406 may determine to use the voltage of an intermediate rail voltage 220, if it exists, whose voltage is above that of a particular load 120. If no intermediate rail voltage 220 is present, then the architecture determination module 406 may utilize the input voltage source 115 as the input voltage for the supply for the load 120. In some instances, architecture determination module 406 may further determine whether or not to use the voltage of an intermediate rail voltage 220 if it can support the total current required and/or if the total required current is below a threshold value. Thus, the architecture determination module 406 may determine a power supply architecture 305 for the combination of zero or more intermediate rail voltages 220.

For each position in the determined power supply architecture 305, the architecture determination module 406 may further determine a load requirement 215 (e.g., voltage and current) for power supply components 205 that may fill the position. For example, a load requirement 215 for a position may be to supply power to one or more loads 120, while another load requirement 215 for a position may be to supply power to an intermediate rail voltage 220. As yet another example, a load requirement 215 for a position may be to supply power to one or more intermediate rail voltages 220 as well as to one or more loads 120.

The architecture determination module 406 may determine a plurality of potential power supply architectures 305 according to different combinations of input voltage sources 115 and intermediate rail voltages 220 with the loads 120 specified by the design requirements 130. Each of the determined power supply architectures 305 may accordingly include one or more positions at which a power supply component 205 (such as a multi-channel voltage regulator) may be required. In some instances, a design heuristic 165 indicates a maximum number of power supply architectures 305 to be determined by the architecture determination module 406.

Referring back to FIGS. 2A and 2B, there are five positions in which a power supply component 205 may be required. In the example of FIG. 2A, four of the five positions provide power to loads 120 directly, and the other position provides an intermediate rail voltage 220. Because the group of 1.25V volt supplies includes a load requiring 3 A and a load requiring 0.2 A, the power supply component 205 for the 1.25V position labeled "Supply_2" in FIG. 2A has a load requirement of 1.25V at 3.2 A. Similarly, the group of 3.3V loads at the position labeled "Supply_3" has a load requirement of 3.3V at 4.7 A. Additional exemplary power supply architectures 305 are shown in FIG. 3 as well, including power supply architecture 305-B with five positions in which a power supply component 205 may be required and no intermediate rail voltages 220, and power supply architecture 305-C having seven positions in which a power supply component 205 may be required and three intermediate rail voltages 220. In the example of FIG. 2B, four of the five positions (SUPPLY_1, SUPPLY_2, SUPPLY_3, and SUPPLY_5) provide power to loads 120 directly, while one position (SUPPLY_4) supplies power for an intermediate voltage rail 220 (which powers SUPPLY_5).

The component determination module 408 may be configured to determine one or more power supply components 205 that could be used to build circuits for a given power supply architecture 305. For instance, for each of the potential power supply architectures 305 determined by the architecture determination module 406, the component determination module 408 may determine power supply components 205 to provide power to one or more loads 120, load groups 210, and/or intermediate rail voltages 220.

More specifically, the component determination module 408 may determine a power supply component 205 that could satisfy the load requirements 215 for a particular position by applying filters to component information 150 stored in data store 145. The load requirements 215 may include output voltage and output current fields based on the grouped design requirements 130 for the loads 120. The filters may compare values specified in the load requirements 215 against values in corresponding information in the component information 150. The components selected may include, for example, single-channel voltage regulators and multi-channel voltage regulators.

As another example, the component determination module 408 may utilize values from the load requirements 215 as inputs to one or more design heuristics 165, where the outputs of the one or more design heuristics 165 may be used to determine which power supply components 205 could potentially satisfy the load requirements 215 for a particular position. For instance, when designing a boost regulator circuit, a design heuristic 165 may be used to determine which power supply components 205 used in boost regulators may meet the switch current requirements implicit in the load requirements 215 for a particular position. Accordingly, to determine which power supply components 205 may be used in that position, the input voltage, output voltage and output current specified for the position may be used to calculate a required switch current rating, where the required switch current rating is compared against the switch current ratings in the component information 150 stored in data store 145 to select only those power supply components 205 that can satisfy the requirements for the position. As yet a further example, the component determination module 408 may filter components to include only components from preferred vendors, manufacturers, or suppliers.

Thus, for each position in the power supply architecture 305 in which a power supply components 205 would be required, a list of possible power supply components 205 for each position in the power supply architecture 305 may be determined. For example, as shown in FIG. 2A, an LM3150 power supply component 205 may be used to meet the load requirements 215 for the position labeled "Supply_2," and an LM3153-3.3 power supply component 205 may be used to meet the load requirements 215 for the position labeled "Supply_3." In some examples, the component determination module 408 may further maintain a list of reasons for the exclusion of power supply components 205 that may be unsuitable for use in a particular position, so that a user may be informed why a particular power supply component 205 is not indicated as being available for use.

A circuit may contain many more supporting components in addition to a particular power supply component 205 that may be used to satisfy at least a subset of the design requirements 130. Based on the determined power supply components 205, the circuit design module 410 may be utilized to determine the supporting components, or parameters and bounds for the supporting components. The circuit design module 410 may further be configured to determine a circuit topology indicating how those additional supporting components may be arranged to create the circuit with the power supply components 205.

The circuit design module 410 may utilize design heuristics 165 and including various rules and mathematical formulas to select adequate values for the additional components. For example, if the design requirements 130 indicate that a load 120 is to be provided a minimal output voltage ripple, a design heuristic 165 may indicate that a larger output capacitor value may be chosen as a supporting component. As another example, if the design requirements 130 indicate that a power supply may be required to withstand sudden change in input voltage (i.e., transient response) then a design heuristic 165 may indicate that a smaller output capacitor value may be chosen as a supporting component.

In some instances, rather than determining a particular value for a supporting component, the circuit design module 410 may instead utilize design heuristics 165 to determine a range of potential values for an additional component of the circuit. For example, for a certain design, an output capacitor must have a capacitance greater than or equal to 100 µF and an equivalent series resistance of less than or equal to 100 MΩ. These rules may then be used by the circuit design module 410 to select supporting components from the parts described in the component information 150 of the data store 145.

The circuit optimization module 412 may be configured to aid in the determination of power supply components 205 and supporting components. For example, the circuit optimization module 412 may determine supporting components that satisfy the range of potential values determined by the circuit design module 410, while also accounting for design preferences indicated in the design requirements 130 through use of optimization heuristics 170. These optimizations and design preferences may accordingly guide the determination of some or even all of the components 205 and supporting components of the power supply designs 125.

Parameters of a component part may be determined based on the component information 150 stored in the data store 145. Accordingly, selection of component parts for a design may be based on an algorithm in which a target value is set for the parameters of the component part. The closer a component parameter is to a target value, the higher the score for that parameter. A weight may also be assigned to each parameter of a component. Thus, a final score for each component may be determined based on the initial score and the weight (e.g., determined as a product of the initial score and the weight). If two parameters with a same deviation from a target value have different weights, the one with a higher weight would receive a higher overall score. This weighted scoring algorithm allows selection of components taking into account multiple parameters at once, keeping a balance between important characteristic factors of the component part such as footprint, parasitic resistance, capacitance, and inductance.

As an example, a design requirement 130 may indicate a preference for power supply designs 125 having high efficiency or low voltage ripple. Accordingly, an optimization heuristic 170 may set a low target for an equivalent series resistance (ESR) parameter of an output capacitor to reduce power dissipation and/or ripple. An optimization heuristic 170 may further set a high weighting for the ESR parameter in relation to other parameters. Using these optimization heuristics 170, capacitors with low ESR would typically achieve higher scores than capacitors with higher ESR, giving the resultant designs improved efficiency.

The optimization heuristics 170 may further allow consideration of other parameters, such as size, capacitance, price, vendor, supplier, manufacturer and part availability in order to determine an overall score for a component. As an example, design requirements 130 may indicate a preference for designs having high efficiency, low cost, and parts that are in stock. Accordingly, one or more optimization heuristics 170 may place a relatively higher weight on a part being in stock at a fulfillment warehouse, a relatively higher weight on a part having a low price, and a relatively higher weight on a part having a low ESR. In such an example, a capacitor having a low ESR, but being out of stock at the fulfillment warehouse and having a high price may receive a lower overall score than a part one that is in stock, less expensive, but with a higher ESR.

In some instances, one or more of the architecture determination module 406, the component determination module 408, the circuit design module 410, and the circuit optimization module 412 may utilize a cutoff to generate up to a maximum number of power supply designs 125. This cutoff may indicate a maximum total number of power supply designs 125 to include in the universe of possible solutions. In other instances, a cutoff may indicate a maximum number of power supply designs 125 per power supply architecture 305.

The schematic determination module 414 may be configured to produce a schematic diagram including the particular power supply components 205 and supporting components determined by the component determination module 408, circuit design module 410, and circuit optimization module 412. In some examples, the schematic determination module 414 may be configured to generate a schematic that may be displayed to a user in a user interface 110 on a web page, by way of the user interface module 402.

For example, the schematic determination module 414 may be configured to draw an electrical schematic by way of the user interface module 402, using vector-based drawing techniques within a web browser application executed by a user device 105. The electrical schematic may show wires and components such as voltage regulator devices and capacitors. In some examples, the schematic determination module 414 may be configured to provide a scale adjustment to allow for a user to adjust the scale at while a schematic is drawn, and zoom in and out of the schematic.

The schematic determination module 414 may further be configured to draw feature blocks that represent collections of components in an included electrical schematic or sub-circuit, rather than drawing each individual component of a sub-circuit. For example, each position in a power supply architecture 305 into which a power supply component 205 is included may be represented as a feature block in the schematic, rather than as a full schematic indicating each supporting component of the power supply component 205. As some further examples, a feature block may represent a sub-circuit configured to create an intermediate rail voltage 220, a sub-circuit configured to provide a power output to a load 120 from an intermediate rail voltage 220, or a sub-circuit configured to provide a power output to a load 120 from an input voltage source 115 directly.

In some instances, the schematic determination module 414 may be configured such that each sub-circuit configured to provide an intermediate rail voltage 220 and/or a power output for a load 120 may be represented as feature block in the electrical schematic. A schematic including such feature blocks would accordingly allow for a higher-level representation of the power supply design 125 to be displayed. The schematic determination module 414 may further be configured to display the corresponding sub-circuit for a feature block upon indication by the user. In some instances, it may be possible for a hierarchy to be created in which feature blocks include sub-circuits that in turn also have included feature blocks including their own sub-circuits.

The schematic determination module 414 may be configured to provide a level-of-detail adjustment to allow for a user to adjust the level of detail at while a schematic is drawn. For example, at a higher level of detail, some or all levels sub-circuits may be represented as their individual components, while at a lower level of detail, a greater number or level of sub-circuits may be represented as feature blocks.

The schematic determination module 414 may further be configured to allow for the selective editing of various components or wires of a schematic diagram, and the schematic determination module 414 may visually indicate which components and/or wires in the schematics may be modifiable. For example, components that are modifiable may be illustrated in color, while components that are non-modifiable may be presented in a black-and-white format. As another example, components that are modifiable may be presented accompanied by a particular graphic.

For components that are indicated as being editable, the schematic determination module 414 may allow for the user to substitute another component for the indicated component. Additionally, one or more ends of a wire included in the schematic may be capable of being moved by a user to allow for additional customization of the schematic.

The board layout module 416 may be configured to create a printed circuit board (PCB) layout according to a determined schematic, such as an electrical schematic determined by the schematic determination module 414. The board layout module 416 may determine an appropriate PCB layout according to various parameters, including the topology the circuit, the IC selected, the size of the selected components, whether the design requires a large amount of copper to dissipate heat or a heat sink to dissipate heat, and the like.

In some examples, the board layout module 416 may be configured to receive an indication of a size of a board on which to layout the components. For instance, the board layout module 416 may provide controls, by way of user interface module 402, to allow for user specification of one or more of PCB width, PCB height, and PCB mounting depth. In other examples, the board layout module 416 may automatically determine where the components are placed on a printed circuit board and delete the portions of the board not used by the components. Thus, the board layout module 416 may be configured to automatically crop the PCB layout based on the components used in the circuit.

In some examples, the board layout module 416 may be configured to determine a PCB layout according to a predetermined landing area approach. In such an approach, a PCB layout of the design is created with a mount for a particular integrated circuit (such as an LM2678 semiconductor) and also with landing pads for various supporting components to be used with the particular IC. The landing pads may be designed to accommodate a variety of combinations of supporting components, which vary in size and shape, by creating the landing pads for the supporting components large enough and spaced closely enough to accommodate different sizes of components that may potentially be used with the IC. Thus, a single PCB board may be used to accommodate many different schematics, having various sizes and varieties of surface mount components.

The electrical simulation module 418 may be configured to allow for an electrical simulation of an electrical schematic, allowing for a user to observe the performance of the circuit under simulated operating conditions. For example, the electrical simulation module 418 may be utilized to determine an electrical efficiency of a power supply design 125.

The thermal simulation module 420 may be configured to identify heat problems on a PCB early on in the design process and correct the issues before a PCB goes into production. Early diagnosis of a thermal issue may save a time and avoid costly quality accidents. The thermal simulation module 420 may be configured to simulate the thermal behavior of an electronic PCB having various components. The thermal simulation module 420 may use thermal models for components to aid in the analysis. For PCBs that are laid out using a standard PCB layout, the thermal simulation module 420 may further utilize a thermal model for the standard PCB layout.

Based on the PCB and components, the thermal simulation module 420 may utilize a conduction, radiation and convection solver. For instance, the thermal simulation module 420 may utilize the WebTHERM™ module provided by Flomerics, Inc. to conduct the thermal simulations. The output of the thermal simulation may be illustrated graphically by way of the user interface module 402, such as by a plot of the PCB under the design's steady state electrical load 120 conditions, illustrating an estimate of the generated heat.

The bill of materials module 422 may be configured to determine a bill of materials (BOM) including the list of parts used for each of the power supply designs 125. The bill of materials module 422 may further determine a total cost of the design and a total number of components for the design. For example, the bill of materials module 422 may query the data store 145 for component information 150 related to pricing of the utilized components, and may determine an overall cost of the power supply design 125 based on a total sum of the cost of each utilized component.

In some examples, the bill of materials module 422 may be configured to prefer components from particular vendors, suppliers, manufacturers over other components. As one possibility, the bill of materials module 422 may list components only from a preferred vendor whenever possible.

The best results determination module 424 may be utilized to determine one or more best results from a set of power supply designs 125. For instance, the best results determination module 424 may determine a ranking of the individual designs in the set of power supply designs 125. The best results determination module 424 may determine the ordering and recommended designs by using a weighted scoring system. As an example, a design requirement 130 may indicate a preference for power supply designs 125 having high efficiency. Accordingly, based on the design requirement 130, the best results determination module 424 may rank the power supply designs 125 according to electrical efficiency for the overall power supply designs 125, where the overall efficiencies may be determined by the electrical simulation module 418.

The best results determination module 424 may determine the ordering while accounting for multiple variables simultaneously. Similar to as discussed above with regard to component selection, the best results ordering may use an algorithm in which a target value is set for one or more parameters of a power supply design 125. The closer a parameter of the power supply design 125 is to the corresponding target, the higher the score for that parameter. A weight may also be assigned to each parameter. Thus, a final score for each power supply design 125 may be determined based on the initial score and the weight (e.g., as a product of the score and weight values). For example, if two parameters with a same deviation from a target value have different weights, the one with the higher weight would receive a higher overall score. This weighted scoring algorithm allows ordering of power supply designs 125 taking into account multiple parameters at once, keeping a balance between important characteristic factors of the component part such as footprint, parasitic resistance, capacitance, and inductance.

The best results determination module 424 may utilize a cutoff to provide up to a maximum number of power supply designs 125. In some instances, a cutoff may indicate a maximum total number of power supply designs 125 to include in the universe of possible solutions. In other instances, a cutoff may indicate a maximum number of power supply designs 125 per power supply architecture 305.

The best results determination module 424 may indicate the power supply design 125 having the best ranking as being the recommended design. Further, the power supply design 125 out of a set of power supply designs 125 for one particular power supply architecture 305 may be indicated as being the recommended design for that power supply architecture 305.

The tabular display module 426 may be configured to display a list of the determined power supply designs 125 by way of the user interface module 402. For example, the tabular display module 426 may present a use interface including a table of power supply designs 125 with key parameters displayed, with each row in the table indicating a particular power supply design 125 and associated values and key parameters. Key parameters may include system footprint determined by the board layout module 416, system BOM cost and system component count determined by the bill of materials module 422, system efficiency determined by the electrical simulation module 418, among others.

The values in the table may be arranged according to the ranking determined by the best results determination module 424. For examples, values in the table may be arranged with the best recommendations at the top of a sortable list. As an example, a design requirement 130 may indicate a preference for designs having high efficiency. Accordingly, based on ranking determined by the best results determination module 424, the power supply designs 125 may be displayed in order according to electrical efficiency.

The graphical display module 428 may be configured to provide a graph of the determined power supply designs 125 by way of the user interface module 402. The graphical display module 428 may represent the tradeoffs between the various power supply designs 125 by representing various key parameters as the X and Y axes of the graph. The graphical display module 428 may further represent the points within the graph as items of varying size and/or color to indicate a third key parameter as a third dimension. Thus, the graph can contain more than two dimensions by using circles of different diameters for each data point to signify larger or smaller values and/or different colors to represent differences in the values being plotted.

As an example, the axes may default to system footprint and system efficiency, with a circle around each data point of variable size to represent the BOM cost. The size of the circle may accordingly vary in size to become larger for a higher BOM cost and smaller for a lower BOM cost. The graphical display module 428 may be configured to allow a user to configure the axes of the graph, allowing the user to visualize other parameters in the design such as the $V_{out}$ peak to peak ripple, frequency, and BOM count, among others.

The design list filter module 430 may be configured to allow for the filtering of the determined power supply designs 125 displayed by the tabular display module 426 and graphical display module 428. For example, the design list filter module 430 may provide slider controls, check boxes and other controls by way of the user interface module 402 that may be used to specify filter criteria for the displayed power supply designs 125. These controls may allow a user of the user device 105 to narrow down the list of power supply designs 125 according to the specified filter criteria. Because the filtering is performed based on the determined set of power supply designs 125 that form the universe of possible solutions, filtering of the power supply designs 125 may be performed by the user device 105 without requiring any additional database access or interaction with the data store 145.

Exemplary filter criteria may include minimum and maximum efficiency, minimum and maximum footprint, minimum and maximum BOM cost, minimum and maximum BOM count, minimum and maximum ripple, minimum and maximum switching frequency, minimum and maximum crossover frequency, and minimum and maximum phase angle. Further exemplary filter criteria may include additional features that may be present on a utilized power supply component 205 package, such as: on/off pin, error pin, soft start, external synchronization, module, adjustable primary leakage inductance limit, adjustable frequency, synchronized switching, controller, and integrated switch. Still further filter criteria may include component vendor, supplier or manufacturer.

The optimization control module 432 may be configured to allow a user to specify system level goals such as small footprint, low cost, or high efficiency. The optimization control module 432 may utilize the user interface module 402 to present a control, such as a knob, to a user device 105, and may receive input from the user from the control. The control may allow the user to select a tradeoff indicating a preference for at least one key parameter over a preference for at least one other key parameter. For example, the control may allow the user to prefer designs with small footprint over designs with high efficiency.

In some instances, based on the input from the control, the optimization control module 432 may be configured to cause the power supply design tool application 160 to calculate additional power supply designs 125 containing power supplies optimized according to the new system level goals indicated by the user. These additional power supply designs 125 may then be added to power supply designs 125.

In other instances, the power supply design tool application 160 may be configured to pre-calculate power supply designs 125 optimized according to each of the potential system level goals or sets of optimizations settings that may be indicated by the user. Then, based on the input from the control, the optimization control module 432 may be configured to cause the power supply design tool application 160 to filter the displayed power supply designs 125 according to the particular optimization settings chosen by the user by way of the optimization control module 432. By performing the filtering based on the pre-calculated power supply designs 125 optimized according to various optimizations settings, the filtering may be performed by the user device 105 without requiring any additional database access or interaction with the data store 145.

An exemplary optimization control module 432 may present a knob providing for selection of one of the following sets of optimizations to use as the system design goals: a first optimization with the goals of smallest possible footprint accomplished through use of the highest possible switching frequencies; a second optimization with the goals of lowest possible cost with frequency pushed higher for smaller components; a third optimization with the goals of a balance of efficiency, footprint, low complexity, and cost; a fourth optimization with the goals of lowest possible cost with frequency pushed lower for increased efficiency; and a fifth optimization with the goals of highest possible efficiency, largest components.

The component acquisition module 434 may be configured to allow a user to purchase the list of parts used in a selected power supply design 125. Using the BOM for a power supply design 125, the component acquisition module 434 may be configured to confirm whether the parts are in stock by querying the component information 150 stored in data store 145. If the parts are determined to be in stock, the component acquisition module 434 may allow the user to purchase a set of parts for building all or a portion of the power supply design 125. The component acquisition module 434 may further be configured to provide assembly instructions for the board that shows the locations of all the components, soldering instructions, an electrical schematic, top-side and bottom-side copper layout diagrams, instructions for building and testing the circuit. In some examples, the component acquisition module 434 may provide an option for the user to receive an assembled version of the power supply design 125. In some examples, the component acquisition module 434 may prefer to order components from preferred vendors, suppliers or manufacturers.

The architecture navigation module 436 may be configured to allow for navigation of the electrical schematic, such as the schematic determined by the schematic determination module 414. Upon selection of one of the power supply designs 125, such as through use of the tabular display module 426 and the graphical display module 428, the architecture navigation module 436 may be configured to display, by way of the user interface module 402, a user interface 110 including a feature block diagram illustrating the power supply architecture 305 of the selected design. For example, the schematic determination module 414 may determine an electrical schematic where each position in power supply design 125 into which a power supply component 205 and supporting components are included is represented as a feature block.

Further, the architecture navigation module 436 may be configured to receive selections of the feature blocks in the diagram, and display particular attributes for the selected feature block. The architecture navigation module 436 may further be configured to display charts and graphs depicting the relative contribution of each power supply component 205 to the power supply design 125 according to various key parameters, such as power dissipation, BOM cost, footprint, and component count.

The report module 438 may be configured to create a report summarizing the attributes of one or more designs. For example, the report module 438 may be utilized by a user to view a report summarizing the attributes of a selected design from the set of power supply designs 125. The report may include system level attributes such as a feature block diagram, system efficiency, system BOM cost, and system component cost. The report may further include specific information about the input voltage sources 115 including the input voltage range. In addition, the report may include information about each specific power supply from the set of power supply designs 125, including the corresponding schematic, BOM, and associated component information including electrical characteristics such as inductance, DC resistance, current rating, voltage rating, etc. Other information about each power supply may be included as well, such as operating values including duty cycle, efficiency, BOM cost, BOM footprint, currents through components, and power dissipation for components. The operating values may be included in a table or as plots of the operating value vs. other facts such as load 120 current for different voltages. The report may also contain simulation results, such as from the electrical simulation module 418 and/or thermal simulation module 420, which may be represented in numeric form, tabular form such as via tabular display module 426, and/or graphical form such as via graphical display module 428. Reports generated by the report module 438 may be provided in various formats, such as the portable document format (PDF).

FIGS. 5A-5D illustrate an exemplary process flow for determining a power supply for multiple loads 210. The process flow may be performed by various systems, such as by the system 100 described above with respect to FIG. 1. The disclosed process flow generates solutions with only single-channel voltage regulators as well as solutions with multi-channel voltage regulators.

In block 502, a power supply design tool application 160 receives design requirements 130 from a user device 105. For example, a communications network 135 may be in selective communication with a user device 105 and an application site 140. The application site 140 may serve as a hosting platform for an application server 155 running the power supply design tool application 160. A user interface module 402 and a requirements module 404 of the power supply design tool application 160 may be configured to provide a user interface 110 to a user device 105, such as a web page, where the user interface 110 may allow the user of the user device 105 to specify the design requirements 130 for a power supply design 125. The design requirements 130 may include information regarding a set of multiple loads 120 to be powered by one or more input voltage sources 115, and whether the user desires for the design tool to generate solutions based on multi-channel voltage regulators.

Figure 5A:
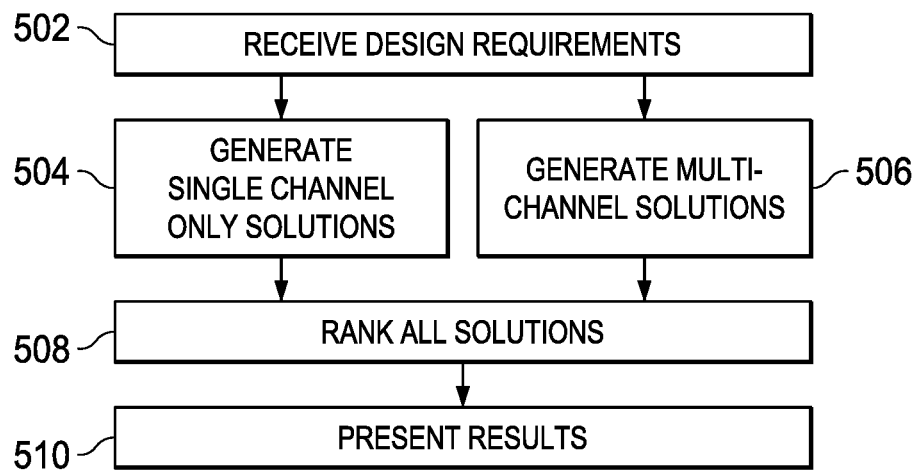
FIGS. 5A-5D illustrate an exemplary process flow for determining a power supply for multiple loads and including multi-channel regulators.
Figure 5B:
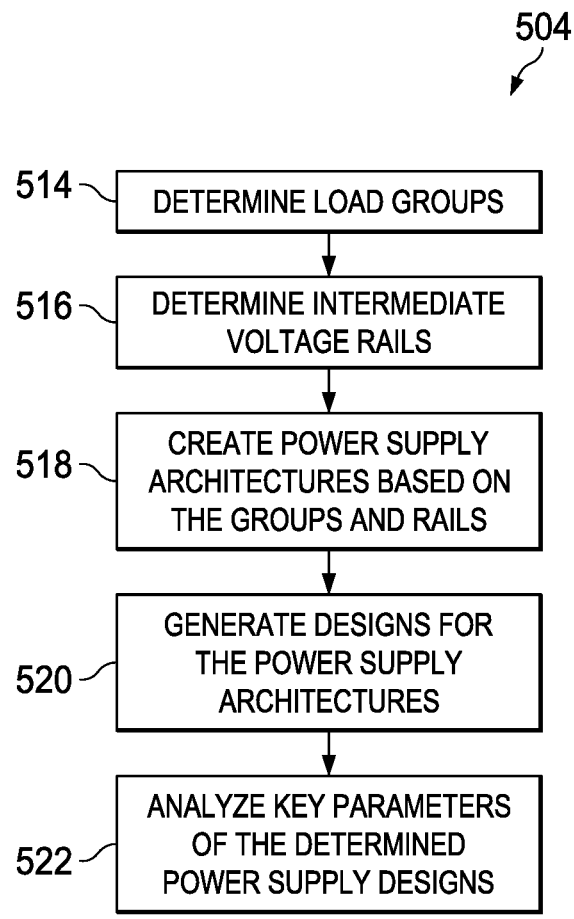
Figure 5C:
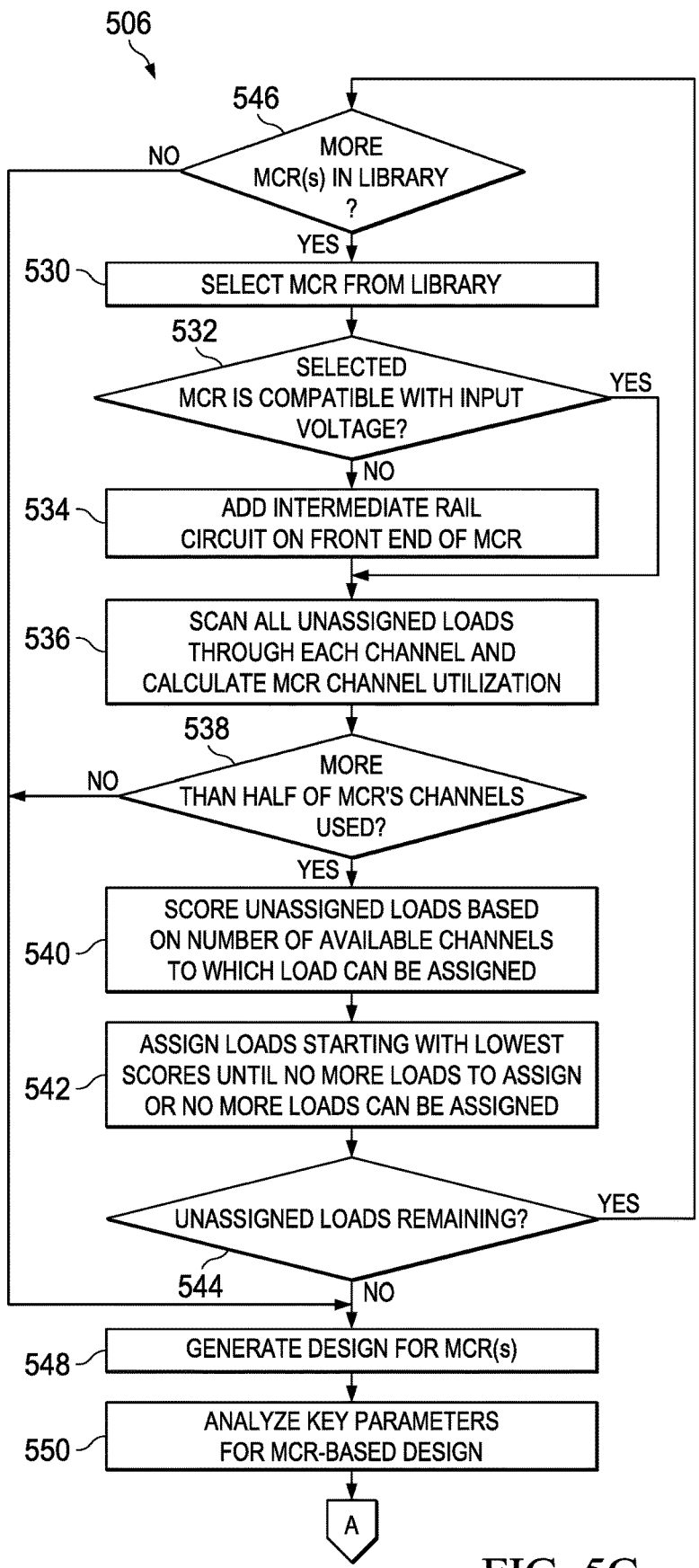
Figure 5D:
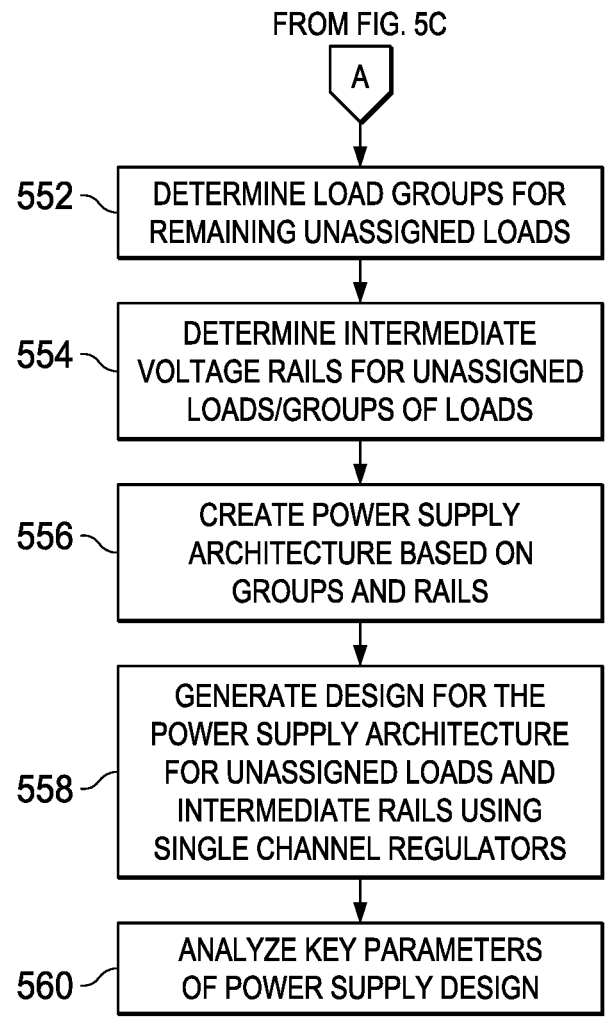

In blocks 504 and 506, the process flow generates single channel voltage regulator only solutions and multi-channel voltage regulator solutions, respectively. FIG. 5B provides detail regarding block 504 and FIGS. 5C and 5D provide detail regarding block 506.

After the various power supply design solutions are generated, in block 508, the power supply design tool application 160 ranks the determined power supply designs 125 based on the design goals indicated in the design requirements 130. For example, the power supply design tool application 160 may utilize a best results determination module 424 to determine one or more best results from a set of power supply designs 125. The best results determination module 424 may determine a ranking of the individual designs in the set of power supply designs 125. The best results determination module 424 may further determine an overall best design, and/or one or more recommended designs. Additionally, for each of the determined power supply architectures 305, the best results determination module 424 may determine the best design out of the power supply designs 125 for each power supply architecture 305.

In block 510, the power supply design tool application 160 presents the power supply designs 125 to the user. For example, the power supply design tool application 160 may send the power supply designs to the user device 105 that form the universe of possible solutions for the design requirements 130. The user device 105 may utilize a tabular display module 426 to display a table of the power supply designs 125 and key parameters, with each row in the table indicating a particular power supply design 125 and associated values. The power supply design tool application 160 may also utilize a graphical display module 428 to provide a graph of the determined power supply designs 125 representing tradeoffs between the various power supply designs 125 according to key parameters. In some examples, the power supply design tool application 160 presents only the best power supply design 125 for each determined power supply architecture 305. The power supply design tool application 160 may further indicate which power supply design 125 out of the presented power supply designs 125 is determined to be the best design. Because the universe of possible power supply designs 125 has already been computed by the power supply design tool application 160, the user device 105 may perform filtering of the determined power supply designs 125 displayed by the tabular display module 426 and graphical display module 428 without additional access or interaction with the data store 145. After block 580, the process 500 ends.

Turning now to FIG. 5B (process flow for the generation of solutions with single channel (not multi-channel voltage regulators)), in block 514, the power supply design tool application 160 groups the set of multiple loads 120 into one or more load groups 210 having corresponding load requirements 215. For example, based on the loads 120 specified by the design requirements 130, the power supply architecture design tool application 160 may utilize an architecture determination module 406 to selectively group loads 120 sharing a common voltage into load groups 210.

In some instances, the design requirements 130 may specify that a load 120 requires a unique supply, in which case that load 120 would not be grouped with other loads 120 into a load group 210. Additionally, the one or more design heuristics 165 of the system 100 may specify a threshold current value above which it would be less likely to find a suitable power supply component 205 for a power supply design 125. Accordingly, if a load group 210 results in a sum of the load 120 currents being above the threshold value, the architecture determination module 406 may break the loads 120 down into two or more load groups 210, each with a smaller total current, to allow for a greater number of possible power supply components 205 to be available to provide power to the load groups 210.

The power supply architecture design tool application 160 may determine a load requirement 215 for a load group 210 according to the common voltage of the load group 210 and a sum of the currents of each load 120 of the load group 210.

In block 516, the power supply design tool application 160 determines intermediate rail voltages 220. For example, the power supply architecture design tool application 160 may determine one or more potential intermediate rail voltages 220 according to one or more design heuristics 165. An example of a design heuristics 165 that may be utilized by the power supply design tool application 160 to calculate intermediate rail voltage 220 may be to determine potential intermediate rail voltages 220 according to the duty cycle of downstream regulators, targeting low, medium, and high duty cycle for the downstream supplies. Another example of a design heuristic 165 that may be utilized by the power supply architecture design tool application 160 to calculate intermediate rail voltage 220 may be to determine potential intermediate rail voltages 220 according different percentages of the difference between the input voltage source 115 and the loads 120 or load requirements 215.

In block 518, the power supply design tool application 160 determines power supply architectures 305 that may be used to satisfy the received design requirements 130. The architecture determination module 406 may generate various power supply architectures 305 by utilizing various combinations of the intermediate rail voltages 220. Using one of the combinations of zero or more intermediate rail voltages 220, the architecture determination module 406 may start at each load 120, or load group 210, and may sum up the currents or use the summed current from a corresponding load requirement 215. Then for each load 120 or group of loads 120, the architecture determination module 406 may determine to use the voltage of an intermediate rail voltage 220, if it exists, whose voltage is above that of a particular load 120. If no intermediate rail voltage 220 is present, then the architecture determination module 406 may utilize the input voltage source 115 as the input voltage for the supply for the load 120. In some instances, architecture determination module 406 may further determine whether or not to use the voltage of an intermediate rail voltage 220 if it can support the total current required and/or if the total required current is below a threshold value. Thus, the architecture determination module 406 may determine a power supply architecture 305 for the combination of zero or more intermediate rail voltages 220. For each position in the determined power supply architecture 305, the architecture determination module 406 may further determine a load requirement 215 (e.g., voltage and current) for power supply components 205 that may fill the position.

The architecture determination module 406 may determine a plurality of potential power supply architectures 305 according to different combinations of input voltage sources 115 and intermediate rail voltages 220 with the loads 120 specified by the design requirements 130. FIG. 3 illustrates an exemplary plurality of potential power supply architectures 305 for a set of load requirement 215. Each of the determined power supply architectures 305 may accordingly include one or more positions at which a power supply component 205 may be required. In some instances, a design heuristic 165 indicates a maximum number of power supply architectures 305 to be determined by the architecture determination module 406.

In block 520, the power supply design tool application 160 generates power supply designs 125 for the determined power supply architectures 305. For example, the power supply design tool application 160 may utilize a component determination module 408, a circuit design module 410, and a circuit optimization module 412 to determine one or more power supply components 205 and supporting components that could be used to build circuits for a given power architecture 305, optimized according to the design goals indicated in the design requirements 130.

For each of the potential power supply architectures 305 determined by the architecture determination module 406, the component determination module 408 may determine power supply components 205 to provide power to one or more loads 120, load groups 210, and/or intermediate rail voltages 220. The circuit design module 410 may utilize design heuristics 165 and including various rules and mathematical formulas to select adequate values for the additional components. For example, the circuit optimization module 412 may determine supporting components that satisfy the range of potential values determined by the circuit design module 410, while also accounting for design preferences indicated in the design requirements 130 through use of optimization heuristics 170. These optimizations and design preferences may accordingly guide the determination of some or even all of the components 205 and supporting components of the power supply designs 125.

In block 522, the power supply design tool application 160 performs analysis of key parameters of the determined power supply designs 125. For example, the power supply design tool application 160 may utilize a schematic determination module 414 to produce an electrical schematic diagram, and a board layout module 416 to create a PCB layout according to the determined schematic. The power supply design tool application 160 may utilize an electrical simulation module 418 to determine an electrical efficiency of an electrical schematic, and a thermal simulation module 420 to simulate the thermal behavior of the PCB layout. The power supply design tool application 160 may also utilize a bill of materials module 422 to determine a BOM including the list of parts used and the total part count for each of the power supply designs 125.

FIGS. 5C and 5D provide a process flow example for the generation of power supply solutions that include at least one multi-channel voltage regulator. At 530, the power supply design tool application 160 selects a multi-channel voltage regulator from a library of such parts in a database. Blocks 532-544 are then performed using the selected multi-channel voltage regulator. At 532, the power supply design tool application 160 determines whether the selected multi-channel voltage regulator is compatible with the input voltage from source 115. That is, a determination is made as to whether the selected multi-channel voltage regulator can operate correctly when provided with the input voltage from source 115. If the multi-channel voltage regulator is not compatible with the input voltage, then at 534, an intermediate voltage rail is added to the circuit on the front end of the multi-channel voltage regulator.

At block 536, all unassigned loads are scanned through each channel of the selected multi-channel voltage regulator and a channel utilization level is calculated. During this scanning process, each load is evaluated against each channel of the multi-channel regulator. Each channel is capable of supplying a certain voltage (or voltage range) at a certain current (or current range). If the voltage and current needs of the load are within the capabilities of a particular channel, then the load can be assigned to that channel. A given load may be assignable to none or one or more of the channels of the regulator. The channel utilization level is the percentage of the regulator's channels that can be loads from among the loads not already assigned to a regulator.

If, as determined at block 538, less than half of the regulator's channels are usable for the loads specified by the user, then control loops to block 546 at which it is decided if an additional multi-channel voltage regulator exists in the library for consideration. If a multi-channel voltage regulator exists in the library for consideration, the next multi-channel voltage regulator is selected at 530 and the process repeats for the newly selected regulator.

If, as determined at block 538, more than half of the regulator's channels are usable for the loads specified by the user, then at 540, the unassigned loads that can be assigned to the regulator are assigned a score based on the number of available channels of the regulator to which the load can be assigned. For example, if a load is assignable to only one channel of regulator, then that load may be assigned a score of 1. If another load is assignable to 3 channels of the regulator, then that load may be assigned a score of 3.

At 542, the loads are assigned to channels of the multi-channel voltage regulator based on the loads' scores. For example, loads may be assigned starting with the load having the lowest score and continuing until no more loads remain to be assigned or until no more loads can be assigned (e.g., based on voltage/current incompatibility).

At block 544, the power supply design tool application 160 determines whether any loads remain that have not yet been assigned to a channel of a multi-channel voltage regulator. If such loads are present, then control loops to decision block 546 for consideration as to whether an additional multi-channel voltage regulator exists in the library yet to be evaluated per the process flow of FIG. 5C.

When all multi-channel voltage regulators have been evaluated and still at least one load remains yet to be assigned to a channel of a multi-channel voltage regulator, then control passes to block 548 at which the power supply design tool application 160 generates a power supply design 125 based on the multi-channel voltage regulator(s) to which loads have been assigned. At 550, the power supply design tool application 160 performs analysis of key parameters of the determined power supply design 125. For example and as described above, the power supply design tool application 160 may utilize a schematic determination module 414 to produce an electrical schematic diagram, and a board layout module 416 to create a PCB layout according to the determined schematic. The power supply design tool application 160 may utilize an electrical simulation module 418 to determine an electrical efficiency of an electrical schematic, and a thermal simulation module 420 to simulate the thermal behavior of the PCB layout. The power supply design tool application 160 may also utilize a bill of materials module 422 to determine a BOM including the list of parts used and the total part count for each of the power supply designs 125.

Continuing with FIG. 5D, the power supply design tool application 160 begins to assign the loads that could not be assigned to channels of the multi-channel voltage regulator(s) to single channel voltage regulators. This process is shown in FIG. 5D and is similar to the process flow of FIG. 5B in which single channel voltage regulators are selected.

At 552, the power supply design tool application 160 groups the set of multiple unassigned loads 120 into one or more load groups 210 having corresponding load requirements 215. For example, based on the loads 120 specified by the design requirements 130, the power supply architecture design tool application 160 may utilize an architecture determination module 406 to selectively group loads 120 sharing a common voltage into load groups 210.

As noted above, in some instances, the design requirements 130 may specify that a load 120 requires a unique supply, in which case that load 120 would not be grouped with other loads 120 into a load group 210. Additionally, the one or more design heuristics 165 of the system 100 may specify a threshold current value above which it would be less likely to find a suitable power supply component 205 for a power supply design 125. Accordingly, if a load group 210 results in a sum of the load 120 currents being above the threshold value, the architecture determination module 406 may break the loads 120 down into two or more load groups 210, each with a smaller total current, to allow for a greater number of possible power supply components 205 to be available to provide power to the load groups 210.

The power supply architecture design tool application 160 may determine a load requirement 215 for a load group 210 according to the common voltage of the load group 210 and a sum of the currents of each load 120 of the load group 210.

In block 554, the power supply design tool application 160 determines intermediate rail voltages 220. For example, the power supply architecture design tool application 160 may determine one or more potential intermediate rail voltages 220 according to one or more design heuristics 165. An example of a design heuristics 165 that may be utilized by the power supply design tool application 160 to calculate intermediate rail voltage 220 may be to determine potential intermediate rail voltages 220 according to the duty cycle of downstream regulators, targeting low, medium, and high duty cycle for the downstream supplies. Another example of a design heuristic 165 that may be utilized by the power supply architecture design tool application 160 to calculate intermediate rail voltage 220 may be to determine potential intermediate rail voltages 220 according different percentages of the difference between the input voltage source 115 and the loads 120 or load requirements 215.

In block 556, the power supply design tool application 160 determines power supply architectures 305 that may be used to satisfy the received design requirements 130. The architecture determination module 406 may generate various power supply architectures 305 by utilizing various combinations of the intermediate rail voltages 220. Using one of the combinations of zero or more intermediate rail voltages 220, the architecture determination module 406 may start at each load 120, or load group 210, and may sum up the currents or use the summed current from a corresponding load requirement 215. Then for each load 120 or group of loads 120, the architecture determination module 406 may determine to use the voltage of an intermediate rail voltage 220, if it exists, whose voltage is above that of a particular load 120. If no intermediate rail voltage 220 is present, then the architecture determination module 406 may utilize the input voltage source 115 as the input voltage for the supply for the load 120. In some instances, architecture determination module 406 may further determine whether or not to use the voltage of an intermediate rail voltage 220 if it can support the total current required and/or if the total required current is below a threshold value. Thus, the architecture determination module 406 may determine a power supply architecture 305 for the combination of zero or more intermediate rail voltages 220. For each position in the determined power supply architecture 305, the architecture determination module 406 may further determine a load requirement 215 (e.g., voltage and current) for power supply components 205 that may fill the position.

The architecture determination module 406 may determine a plurality of potential power supply architectures 305 according to different combinations of input voltage sources 115 and intermediate rail voltages 220 with the loads 120 specified by the design requirements 130. FIG. 3 illustrates an exemplary plurality of potential power supply architectures 305 for a set of load requirement 215. Each of the determined power supply architectures 305 may accordingly include one or more positions at which a power supply component 205 may be required. In some instances, a design heuristic 165 indicates a maximum number of power supply architectures 305 to be determined by the architecture determination module 406.

In block 558, the power supply design tool application 160 generates power supply designs 125 for the determined power supply architectures 305. For example, the power supply design tool application 160 may utilize a component determination module 408, a circuit design module 410, and a circuit optimization module 412 to determine one or more power supply components 205 and supporting components that could be used to build circuits for a given power architecture 305, optimized according to the design goals indicated in the design requirements 130.

For each of the potential power supply architectures 305 determined by the architecture determination module 406, the component determination module 408 may determine power supply components 205 to provide power to one or more loads 120, load groups 210, and/or intermediate rail voltages 220. The circuit design module 410 may utilize design heuristics 165 and including various rules and mathematical formulas to select adequate values for the additional components. For example, the circuit optimization module 412 may determine supporting components that satisfy the range of potential values determined by the circuit design module 410, while also accounting for design preferences indicated in the design requirements 130 through use of optimization heuristics 170. These optimizations and design preferences may accordingly guide the determination of some or even all of the components 205 and supporting components of the power supply designs 125.

In block 560 and as described above, the power supply design tool application 160 performs analysis of key parameters of the determined power supply designs 125 that include the single channel voltage regulators.

The process flow illustrated in FIGS. 5C and 5D begun with the selection of a multi-channel voltage regulator from a library containing multiple multi-channel voltage regulators. Additional multi-channel voltage regulators from the library are analyzed in sequence until as many loads as possible are assigned to channels of the various multi-channel voltage regulators. The process flow of FIGS. 5C and 5D is repeated additional times, each time starting with a different multi-channel voltage regulator from the library. For example, if the library contains 10 multi-channel voltage regulators, then the process flow of FIGS. 5C and 5D is repeated 10 times and may result in 10 different power supply designs depending, for example, on the multichannel regulator channel utilization.

Figure 6:
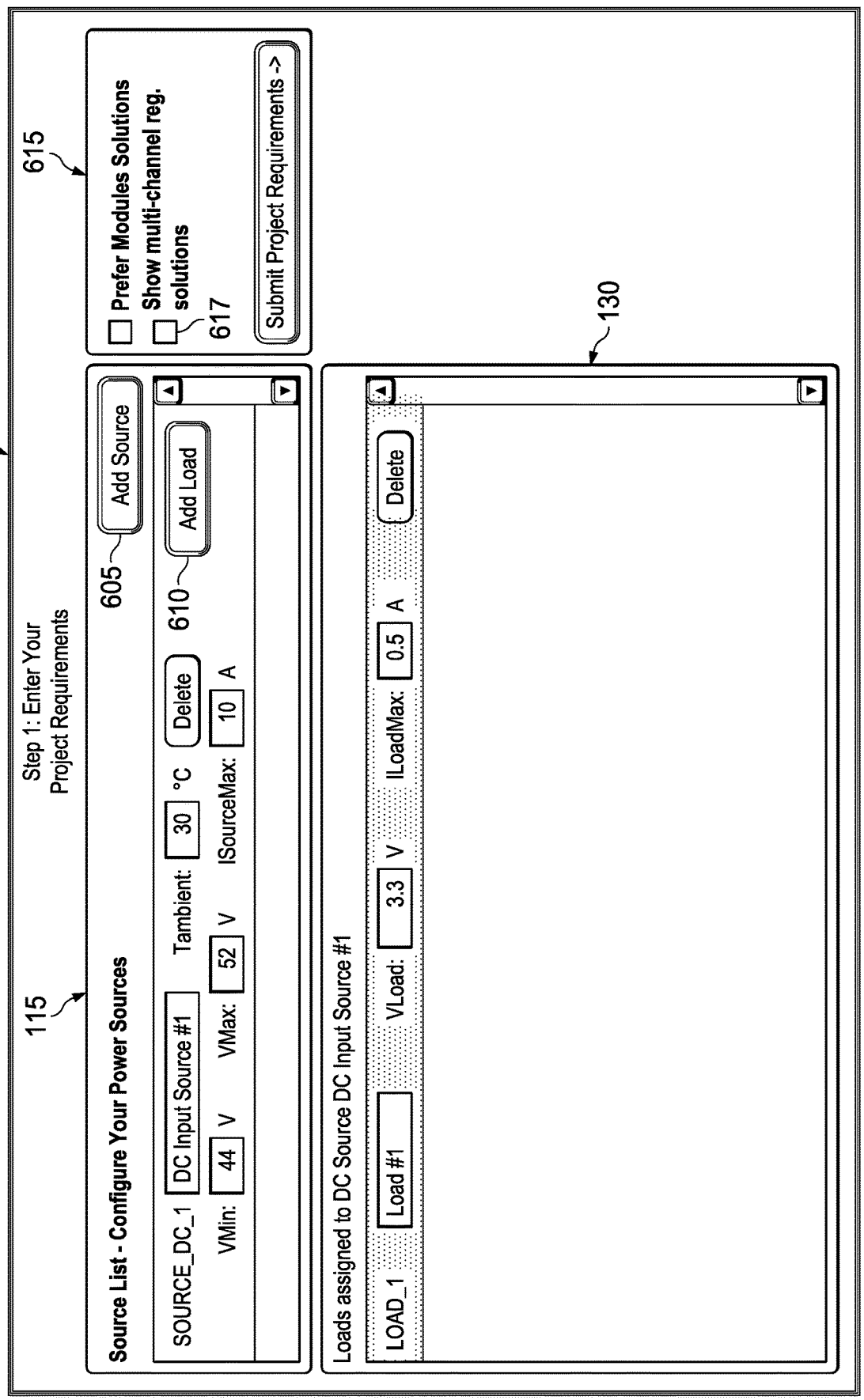
FIG. 6 illustrates an exemplary user interface for the input of design requirements.

FIG. 6 illustrates an exemplary user interface 110-A for the input of design requirements 130. For example, the user interface 110-A may be generated by a user interface module 402 of a power supply design tool application 160, and may allow for a user of a user device 105 to input design requirements 130. As shown, the user interface 110-A may provide for the input of one or more input voltage sources 115, and a plurality of loads 120 assigned to the corresponding input voltage sources 115 by way of an add source control 605, an add load control 610, and a submit project requirements control 615.

The user may utilize an add source control 605 to add an input voltage source 115 to the design requirements 130. Each input voltage source 115 added to the design requirements 130 may allow for the specification of a name, an ambient temperature, a minimum voltage, and a maximum voltage.

The user may further utilize an add load control 610 to add an additional load 120 to the design requirement 130. Each load 120 added to the design requirements 130 may allow for the specification of a name, a voltage for the load 120, a maximum current for the load 120, an optional percentage maximum for voltage ripple, optional filtration, an indication that a particular load 120 requires a separate supply for use in grouping the loads 120, and a number of milliseconds of soft start time.

A user control 617 permits the user to specify whether the power supply design tool application is to generate solutions that include multi-channel voltage regulators. If the user selects that option, the process flow of FIGS. 5A-5D is performed. If the user does not select this option, then the blocks 506 and all of FIGS. 5C and 5D are not performed, but the remaining blocks are performed.

Once the user has completed specification of the design requirements 130, the user may select the submit project requirements control 615. Upon selection of the submit project requirements control 615, the power supply design tool application 160 may determine a set of generated power supply designs 125 according to the design requirements 130.

FIG. 7 illustrates an exemplary user interface 110-B for the input of design requirements 130, illustrating the inclusion of multiple loads 120 into the design requirements 130. As shown in user interface 110-B, the set of loads 120 from user interface 110-C are added to the design requirements 130. If additional loads 120 or input voltage sources 115 are required, then the user interface 110-B may allow for their inclusion by way of an add source control 605 and/or an add load control 610 as discussed about with respect to user interface 110-A in FIG. 6. Once the user has completed specification of the design requirements 130, the user may select the submit project requirements control 615.

Figure 8:
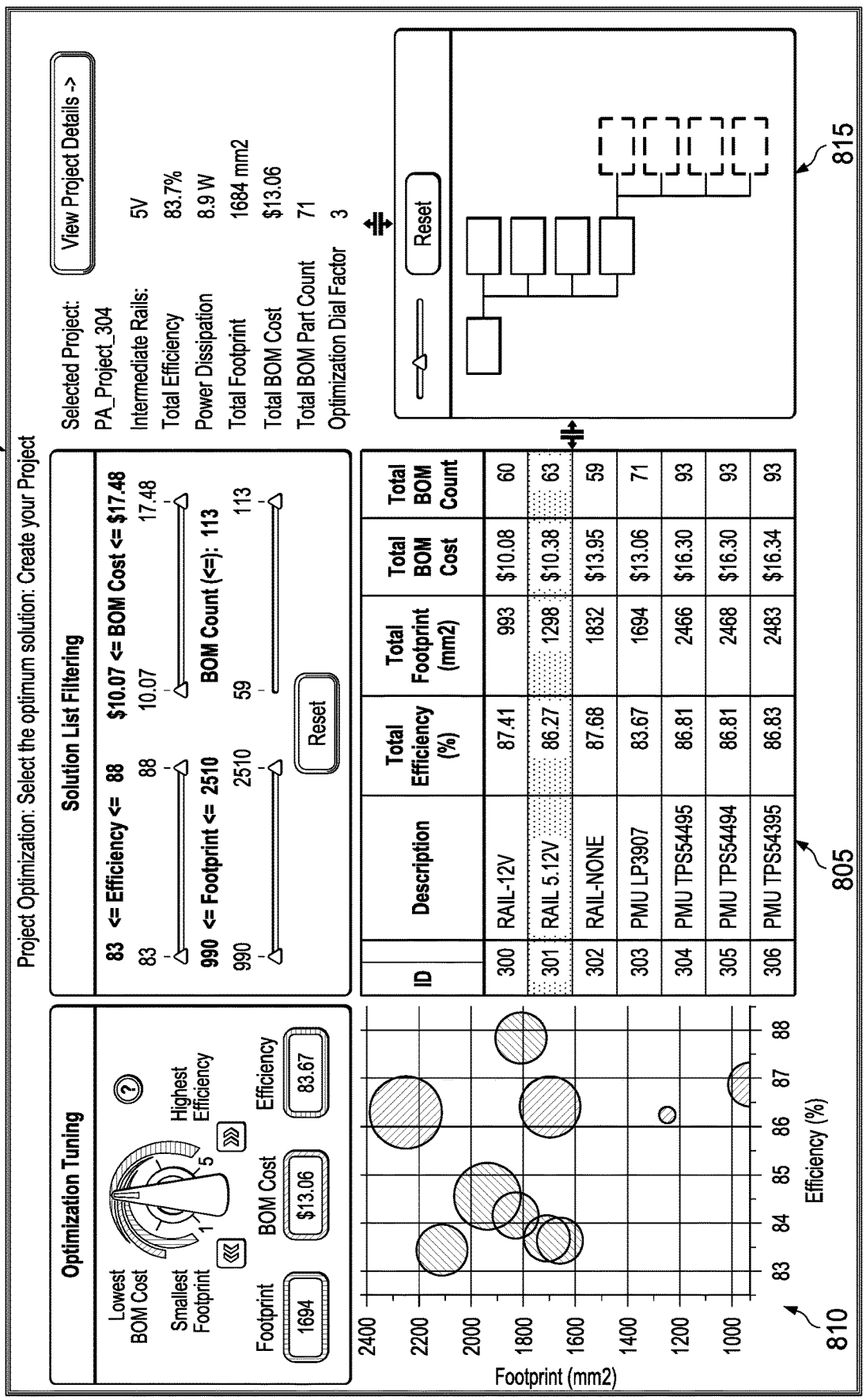
FIG. 8 illustrates an exemplary user interface illustrating a set of generated power supply designs.

FIG. 8 illustrates an exemplary user interface 110-C illustrating a set of generated power supply designs 125. As shown in the user interface 110-C, five power supply designs 125 are included in a tabular list 805 and a graphical display 810 of the power supply designs 125. The tabular list 805 may be created by a tabular display module 426 of the power supply design tool application 160, and the graphical display 810 may be created by a graphical display module 428 of the power supply design tool application 160. The user interface 110-C further includes a schematic diagram 815 that may be created by a schematic determination module 414 illustrating a selected power supply design 125.

Notably, rather than displaying fifty or more power supply designs 125 for each of the determined power supply architectures 305, the tabular list 805 instead may display a best design for each of the different determined power supply architectures 305. For example, the exemplary tabular list 805 as shown includes a best design for power supply architectures 305 having a 12V intermediate rail voltage 220, a best design for power supply architectures 305 having both 5V and 12V intermediate rail voltages 220, a best design for power supply architectures 305 having a 5V intermediate rail voltage 220, a best design for power supply architectures 305 having a 23V intermediate rail voltage 220, and a best design for power supply architectures 305 having no intermediate rail voltages 220. The tabular list 805 may further include values for key parameters of the power supply designs 125 such as efficiency, footprint, BOM cost, and BOM count.

The displayed list of designs in tabular list 805 also includes multi-channel voltage regulator-based designs designated with the acronym PMU which stands for Power Management Unit. For example, design IDs 303-306 are PMU designs which include multi-channel regulators. Design IDs 300 and 301 do not include multi-channel voltage regulators.

The schematic diagram 815 represents on such multi-channel voltage regulator based design (ID 304). The four channels of the multi-channel voltage regulator are illustrated in dashed box form.

These details of the power supply designs 125 may further be displayed graphically in the graphical display 810. For example, in the graphical display 810 the X-axis may represent system efficiency, and the Y-axis may represent system footprint. The circle size in the graphical display 810 may indicate system BOM cost, where a larger circle represents a larger cost, and a smaller circle represents a smaller cost. The axis and the circles may be reconfigured to display different key parameters as well. For example, any of the X-axis, the Y-axis, and the circle size may be reconfigured to represent any of total efficiency, power dissipation, total footprint, total bill of materials cost, total component count, among others key parameters.

Further details of a selected one of the power supply designs 125 may also be illustrated in the user interface 110-C, including by way of the schematic diagram 815 of the selected power supply design 125 that may be created by a schematic determination module 414, as well as other key parameters of the selected power supply design 125, such as the intermediate rail voltages 220, total efficiency, power dissipation, total footprint, total bill of materials cost, total component count, and an optimization factor relating to the optimizations used to determine the selected power supply design 125.

Figure 9:
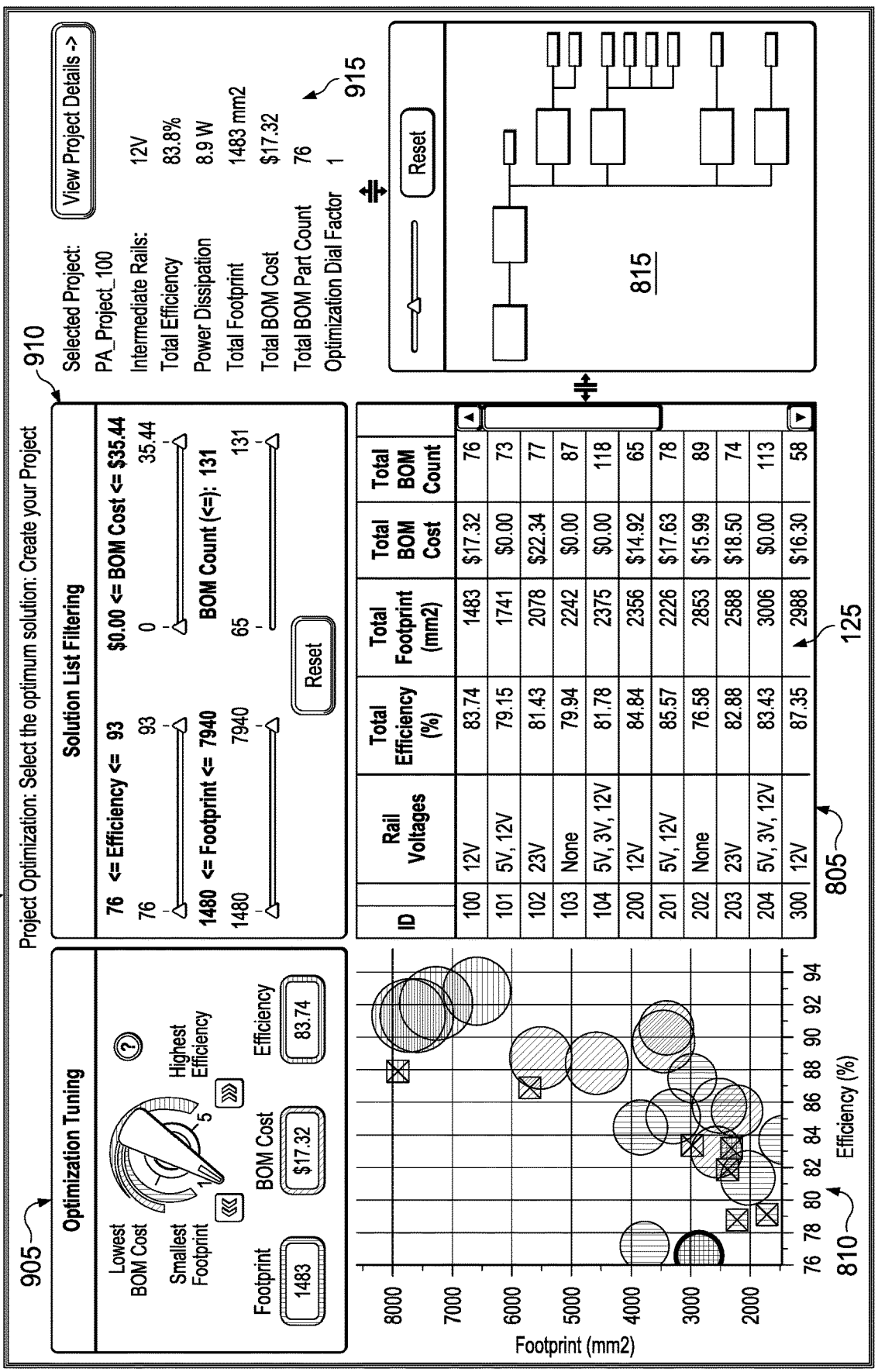
FIG. 9 illustrates an exemplary user interface illustrating additional generated power supply designs.

FIG. 9 illustrates an exemplary user interface 110-D illustrating additional generated power supply designs 125. These additional power supply designs 125 may be added by submitting additional design requirements 130 configured to optimize the power supply designs 125 for different values of key parameters. For example, additional power supply designs 125 may be generated upon selection of a different optimization setting from an optimization tuning dial 905 provided by an optimization control module 432 of the power supply architecture design tool application 160. As shown in user interface 110-D, the additional power supply designs 125 may be added to the tabular list 805 and graphical display 810. Notably, the existing recommended designs optimized for previous design requirements 130 are retained in the displayed power supply designs 125. This allows for the comparison of the best power supply designs 125 optimized according to different optimization settings.

It should be noted that in other examples, the power supply design tool application 160 may be configured to pre-calculate power supply designs 125 optimized according to each of the potential system level goals or sets of optimizations settings indicated by the user. Then, based on the input from the control, the optimization control module 432 may be configured to cause the power supply design tool application 160 to filter the displayed power supply designs 125 according to the particular optimization settings chosen by the user by way of the optimization control module 432.

The user interface 110-D may also allow for the filtering of the set of power supply designs 125 illustrated in the tabular list 805 and graphical display 810 by way of filtering controls 910. The filtering may be performed by a design list filter module 430 of the power supply design tool application 160, and may allow for filtering of the power supply designs 125 by the user device 105 according to parameters such as minimum and maximum efficiency, minimum and maximum footprint, minimum and maximum BOM cost, and minimum and maximum BOM count. Because the filtering is performed based on the determined set of power supply designs 125 that form the universe of possible solutions, filtering of the power supply designs 125 may be performed by the user device 105 without requiring any additional database access or interaction with the data store 145.

Further details of a selected power supply design 125 may be illustrated upon selection of a project details control 915 of the user interface 110-D.

Figure 10:
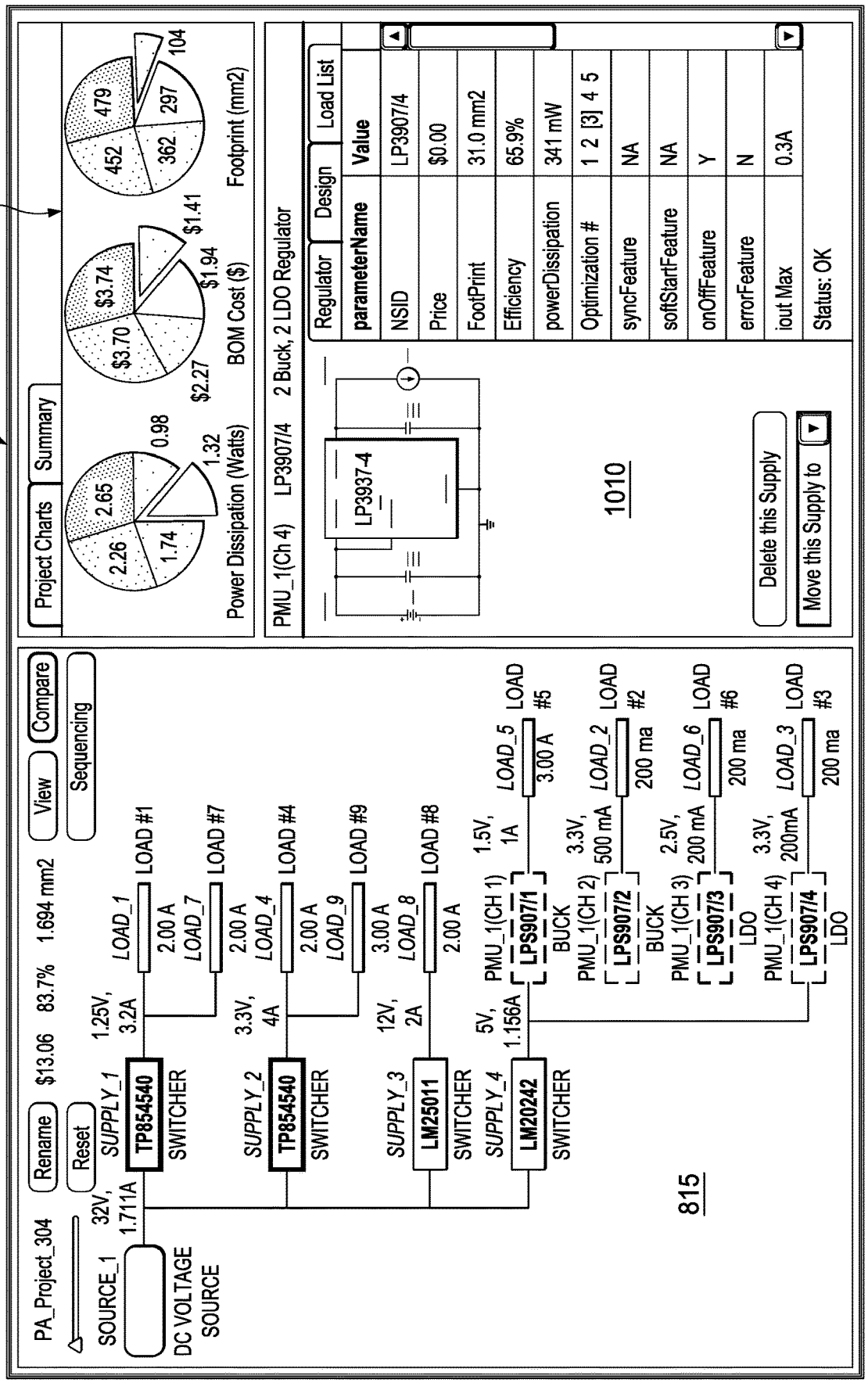
FIG. 10 illustrates an exemplary user interface illustrating exemplary project details for one of the power supply designs, including project charts related to key parameters of the one power supply design.

FIG. 10 illustrates an exemplary user interface 110-E illustrating such further details for one of the power supply designs 125, including project charts 1005 related to key parameters of the one power supply design 125. As shown in user interface 110-E, the power supply design tool application 160 may include a schematic diagram 815 of the selected power supply design 125, project charts 1005 relating to the selected power supply design 125, and solution information 1010 relating to the selected power supply design 125. These controls may allow for visualization of aspects of the selected power supply design 125, including the relative contributions of component supplies to the total values of various key parameters.

The schematic diagram 815 may display the selected power supply design 125 with each power supply component 205 or functional block of the schematic indicated in a different color or other visual identification.

The user interface 110-E may further include project charts 1005 determined by the architecture navigation module 436 that graphically represent the relative contribution of each feature block to the whole power supply design 125. For example, the project charts 1005 may represent the relative contributions of each feature block according to key parameters, such as power dissipation, BOM cost, and footprint. Through use of the project charts 1005, a user may determine the relative contributions of each power supply design 125 according to the key parameters.

The user may further determine whether one of the supplies in the power supply design 125 is making too large of a contribution and may take corrective action. For example, if one power supply component 205 is responsible for most of the footprint, the user may select another power supply component 205 with a smaller footprint, if one is available. For example, an alternate solutions tab of the solution information 1010 may allow the user to choose another power supply component 205.

Upon selection of a create project details control 1015, the power supply design 125 may be input into a circuit design tool for further analysis.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a database configured to store information comprising characteristics of a plurality of components including multi-channel voltage regulators;
at least one processor coupled to the database; and
a non-transitory computer readable storage medium storing a program for execution by the at least one processor, the program causing the at least one processor to:
receive, from a user device, design parameters indicating a plurality of power supply loads;
query the database for at least some of the characteristics of the plurality of components, based on the design parameters;
receive, from the database, characteristics of at least some of the multi-channel voltage regulators, after querying the database;
generate a plurality of power supply designs satisfying the plurality of power supply loads, based on the characteristics of at least some of the multi-channel voltage regulators, comprising:
scanning unassigned loads through multiple channels of a multi-channel voltage regulator of the multi-channel voltage regulators, to determine a channel utilization level; and
determining whether to select the multi-channel voltage regulator based on the channel utilization level; and
send, to the user device, the plurality of power supply designs.

2. The system of claim 1, wherein a second power supply design of the plurality of power supply designs comprises a single-channel voltage regulator.

3. The system of claim 1, wherein the program further causes the at least one processor to:
assign loads to channels of the first multi-channel voltage regulator, in response to determining that the channel utilization level is more than a predetermined amount of channel loads.

4. The system of claim 3, wherein the predetermined amount of channel loads is 50%.

5. The system of claim 3, wherein the program further causes the at least one processor to:
generate power supply designs for multi-channel voltage regulators to which loads have been assigned; and
assign remaining unassigned loads to single channel voltage regulators.

6. The system of claim 1, wherein the program further causes the at least one processor to:
discard the multi-channel voltage regulator from further consideration in response to determining that the channel utilization level is less than a threshold amount of channels.

7. The system of claim 6, wherein the threshold amount of channels is 50%.

8. A method, comprising:
receiving, by a server from a user device, design parameters indicating a plurality of power supply loads;
querying, by the server, a database for at least some characteristics of a plurality of components, based on the design parameters;
receiving, by the server from the database, characteristics of multi-channel voltage regulators, after querying the database;
generating, by the server, a plurality of power supply designs satisfying the plurality of power supply loads, based on the characteristics of the multi-channel voltage regulators, comprising:
scanning unassigned loads through multiple channels of a multi-channel voltage regulator of the multi-channel voltage regulators, to determine a channel utilization level; and
determining whether to select the multi-channel voltage regulator based on the channel utilization level; and
sending, by the server to the user device, the plurality of power supply designs.

9. The method of claim 8, wherein generating the plurality of power supply designs further comprises:
assigning loads to channels of a multi-channel voltage regulator of the multi-channel voltage regulators, in response to determining that the channel utilization level is more than a predetermined amount of channel loads.

10. The method of claim 9, further comprising:
computing a score for the unassigned loads as a function of a number of channels of the multi-channel voltage regulator to which unassigned loads can be assigned based on electrical characteristics of the channels and the unassigned loads; and
wherein assigning loads to channels of the multi-channel voltage regulator comprises assigning loads based on their scores.

11. The method of claim 9, wherein the predetermined amount of channel loads is 50%.

12. The method of claim 8, further comprising:
discarding the multi-channel voltage regulator from further consideration, in response to determining that the channel utilization level is less than a threshold amount of channels.

13. The method of claim 12, wherein the threshold amount of channels is 50%.

14. The method of claim 12, wherein the method further comprises:
generating power supply designs for multi-channel voltage regulators to which loads have been assigned; and
assigning remaining unassigned loads to single channel voltage regulators.

15. A non-transitory computer readable storage medium storing a program for execution by a processor of a server, the program causing the processor to:
receive, from a user device, design parameters indicating a plurality of power supply loads;
query a database for at least some characteristics of a plurality of components, based on the design parameters;
receive, from the database, characteristics of multi-channel voltage regulators, after querying the database;
generate a plurality of power supply designs satisfying the plurality of power supply loads, based on the characteristics the multi-channel voltage regulators, comprising scanning unassigned loads through multiple channels of a multi-channel voltage regulator of the multi-channel voltage regulators, to determine a channel utilization level; and determining whether to select the multi-channel voltage regulator based on the channel utilization level; and send, to the user device, the plurality of power supply designs.

16. The non-transitory computer readable storage medium of claim 15, wherein the program further causes the processor to:

assign loads to channels of the multi-channel voltage regulator, in response to determining that the channel utilization level is more than a predetermined amount of channel loads.

17. The non-transitory computer readable storage medium of claim 16, wherein the program further causes the processor to:

compute scores for unassigned loads as a function of a number of channels of the multi-channel voltage regulator, based on electrical characteristics of the channels and a load of an unassigned load; and assign loads to channels of the multi-channel voltage regulator based on scores for the unassigned load.

18. The non-transitory computer readable storage medium of claim 16, wherein the program further causes the processor to discard the multi-channel voltage regulator from further consideration, in response to determining that loads can only be assigned to less than a threshold amount of channels of the multi-channel voltage regulators.

19. The non-transitory computer readable storage medium of claim 18, wherein the threshold amount of channels is 50%.

20. The non-transitory computer readable storage medium of claim 18, wherein the program further causes the processor to:

generate power supply designs for multi-channel voltage regulators to which loads have been assigned; and assign any remaining unassigned loads to single channel voltage regulators.

* * * * *